United States Patent
Fukui et al.

(10) Patent No.: US 11,942,288 B2
(45) Date of Patent: Mar. 26, 2024

(54) OPERATION SWITCH UNIT WITH OPERATION SUPPORT FUNCTION, OPERATION UNIT WITH OPERATION SUPPORT FUNCTION, AND OPERATION SUPPORT SYSTEM

(71) Applicant: IDEC Corporation, Osaka (JP)

(72) Inventors: Takao Fukui, Osaka (JP); Yasuo Onishi, Osaka (JP); Eiji Yoshii, Osaka (JP)

(73) Assignee: IDEC CORPORATION, Osaka (JP)

( * ) Notice: Subject to any disclaimer, the term of this patent is extended or adjusted under 35 U.S.C. 154(b) by 116 days.

(21) Appl. No.: 17/429,428

(22) PCT Filed: Feb. 24, 2020

(86) PCT No.: PCT/JP2020/007273
§ 371 (c)(1),
(2) Date: Aug. 9, 2021

(87) PCT Pub. No.: WO2020/175413
PCT Pub. Date: Sep. 3, 2020

(65) Prior Publication Data
US 2022/0130625 A1  Apr. 28, 2022

(30) Foreign Application Priority Data
Feb. 27, 2019  (JP) ................... 2019-034748

(51) Int. Cl.
*H01H 3/02* (2006.01)
*B25J 9/16* (2006.01)
(Continued)

(52) U.S. Cl.
CPC ............ *H01H 3/022* (2013.01); *B25J 9/1674* (2013.01); *B25J 13/06* (2013.01); *B25J 19/06* (2013.01);
(Continued)

(58) Field of Classification Search
CPC ........ H01H 3/022; H01H 13/14; H01H 13/62; H01H 2003/0246; H01H 9/167;
(Continued)

(56) References Cited

U.S. PATENT DOCUMENTS 6,288,352 B1    9/2001  Fukui et al.
6,714,106 B1 *  3/2004  Czarnecki ................ H01H 3/22
                                                              335/189
(Continued)

FOREIGN PATENT DOCUMENTS

JP    58-103450 U      7/1983
JP    2000-164062 A    6/2000
(Continued)

OTHER PUBLICATIONS

English translation of the International Search Report of the International Searching Authority for International Application PCT/JP2020/007273, dated Jun. 2, 2020, 2 pages, Japan Patent Office, Tokyo, Japan.
(Continued)

*Primary Examiner* — Lheiren Mae A Caroc
(74) *Attorney, Agent, or Firm* — CANTOR COLBURN LLP

(57) ABSTRACT

The emergency stop switch 2 performs an operation support of an operation switch, and not only improves operability and safety but also simplifies the structure to enhance reliability. The emergency stop switch (or operation switch unit) 2 with an operation support function includes an emergency stop button (or operation switch) 21 for switching the state of the contact, a reception part (or detection part) 32 for detecting a remote operation of the emergency stop button 21 and an electromagnetic solenoid (or actuating part) 3 that is disposed between the contact and the emergency stop button 21 and that actuates the emergency stop
(Continued)

button 21 on the basis of the remote operation received (or detected) by the reception part 32. The emergency stop button 21 is located on one end side of the emergency stop switch 2 and the contact is located on the other end side of the emergency stop switch 2.

3 Claims, 12 Drawing Sheets

(51) Int. Cl.
| | |
|---|---|
| *B25J 13/06* | (2006.01) |
| *B25J 19/06* | (2006.01) |
| *G05B 9/02* | (2006.01) |
| *G05B 19/409* | (2006.01) |
| *H01H 13/14* | (2006.01) |
| *H01H 13/62* | (2006.01) |

(52) U.S. Cl.
CPC ............. *G05B 9/02* (2013.01); *G05B 19/409* (2013.01); *H01H 13/14* (2013.01); *H01H 13/62* (2013.01); *G05B 2219/50198* (2013.01); *H01H 2003/0246* (2013.01)

(58) Field of Classification Search
CPC ........... H01H 13/568; H01H 2003/024; H01H 2300/03; H01H 3/28; H01H 3/02; B25J 9/1674; B25J 13/06; B25J 19/06; B25J 9/16; G05B 9/02; G05B 19/409; G05B 2219/50198
USPC ........................................................ 200/331
See application file for complete search history.

(56) References Cited

U.S. PATENT DOCUMENTS

| | | | |
|---|---|---|---|
| 10,559,433 B2 * | 2/2020 | Hanson | H01H 23/02 |
| 2020/0365342 A1 * | 11/2020 | Fujitani | H01H 3/12 |

FOREIGN PATENT DOCUMENTS

| | | | |
|---|---|---|---|
| JP | 2001-023472 A | | 1/2001 |
| JP | 2001-035302 A | | 2/2001 |
| JP | 2005-294047 A | | 10/2005 |

OTHER PUBLICATIONS

PCT Examiner Miki Kobayashi, PCT International Preliminary Report on Patentability including English Translation of PCT Written Opinion of the International Searching Authority for International Application PCT/JP2020/007273, dated Aug. 25, 2021, 7 pages, International Bureau of WIPO, Geneva, Switzerland.

* cited by examiner

OPERATION SWITCH UNIT WITH OPERATION SUPPORT FUNCTION, OPERATION UNIT WITH OPERATION SUPPORT FUNCTION, AND OPERATION SUPPORT SYSTEM

TECHNICAL FIELD

The present invention relates generally to an operation switch unit and an operation unit with an operation support function that can perform an operation support of an operation switch, and to an operation support system.

BACKGROUND ART

Generally, an emergency stop switch includes a push button (or an operation switch) that is pressable by an operator, an operation shaft that is slidable by pressing on the push button, and a contact that is turned on and off according to a movement of the operation shaft (see FIG. 1 of Japanese patent application publication No. 2001-35302). At the time of operation of the emergency stop switch, the movement of the operation shaft causes the contact to be turned off to break an electric circuit of an apparatus, thus making the apparatus emergency-stop.

PRIOR ART REFERENCES

Patent Documents

Patent Document 1: Japanese patent application publication No. 2001-35302 (see FIG. 1).

SUMMARY OF THE INVENTION

Objects to be Achieved by the Invention

In the prior-art emergency stop switch, an operator needs to be so close to the emergency stop switch in operating the push button. He/she was not able to operate the emergency stop switch at a place away from the emergency stop switch. Therefore, there has been a demand for an emergency stop switch with an operation support function that enables operation even at a place away from the emergency stop switch.

The present invention has been made in view of these circumstances and its object is to provide an operation switch unit with an operation support function, an operation unit with an operation support function and an operation support system that can per form an operation support of an operation switch thus improving operability and safety. The present invention is also directed to providing an operation switch unit with an operation support function that can simplify the structure and improve reliability.

Means of Achieving the Objects

An operation switch unit with an operation support function according to the present invention comprises an operation switch for switching a state of a contact, a detection part that detects a remote operation of the operation switch, and an actuating part that is disposed between the contact and the operation switch and that actuates the operation switch on the basis of the remote operation detected by the detection part.

According to the present invention, the remote operation relative to the operation switch is detected by the detection part. Then, the actuating part actuates the operation switch on the basis of the remote operation detected by the detection part to switch the state of the contact. Thereby, the operation switch can be operated from a distance, so that operation support of the operation switch can be achieved. As a result, operability can be improved and safety dan be enhanced. Also, in this case, since the contact is disposed on the opposite side of the operation switch with the actuating part being disposed therebetween, the structure can be simplified, and reliability can be improved.

The operation switch may be located on one end side of the operation switch unit and the contact may be located on the other end side of the operation switch unit.

The operation switch unit may further comprise an operation shaft movably linked with an operation of the operation switch, and the contact may comprise a movable contact that is movable along a moving direction of the operation shaft and a fixed contact that is fixed on the side of a housing of the operation switch unit. In this case, when the operation shaft moves in accordance with the operation of the operation switch, the movable contact moves along the moving direction of the operation shaft. Thereby, the state of the contact between the movable contact and the fixed contact is switched.

The operation switch unit may further comprise an operation shaft movably linked with an operation of the operation switch and the contact may include a shiftable contact that is shiftable crossing a moving direction of the operation shaft. In this case, when the operation shaft moves in accordance with the operation of the operation switch, the shiftable contact moves along the direction crossing the moving direction of the operation shaft. Thereby, the state of the contact is switched.

The contact may be provided to detect an intermediate state between an ON state and an OFF state of the operation switch. Thereby, malfunction, etc. of the operation switch can be detected thus improving reliability as an operation switch unit.

The operation switch unit may further comprise a biasing means that biases the operation switch from an ON state to an OFF state. Thereby, even in the case that the operation switch is damaged, the operation switch can be transferred to the OFF state thus further enhancing safety.

The biasing force of the biasing means may act in an actuating direction of the actuating part. Thereby, a load can be reduced when the actuating part actuates the operation switch thus lowering an output of the actuating part to decrease a cost.

The biasing force of the biasing means may act in an operating direction of the operation switch. Thereby, at the time of operation of the operation switch, switching of the state of the contact can be performed more securely.

The biasing force of the biasing means may be set in such a way that the biasing force after an operation of the operation switch is smaller than the biasing force before the operation of the operation switch. Thereby, after operation of the operation switch, an elastic energy that the biasing means possessed is decreased. The elastic energy of the biasing means is lower than the elastic energy before operation of the operation switch. As a result, even in the case that the operation switch is damaged after operation of the operation switch, the contact will not return to the state before switching, thus further enhancing safety.

The operation switch may be an emergency stop button.

An operation unit with an operation support function according to the present invention comprises a subordinate operation shaft releasably engageable with a primary operation shaft of an external unit, the primary operation shaft being movably linked with an operation of an operation switch, a detection part that detects a remote operation of the subordinate operation shaft, and an actuating part that actuates the subordinate operation shaft on the basis of the remote operation detected by the detection part.

According to the present invention, the remote operation relative to the subordinate operation shaft is detected by the detection part. Then, the actuating part actuates the subordinate operation shaft on the basis of the remote operation detected by the detection part to switch the state of the contact. Thereby, the subordinate operation shaft can be operated from a distance, so that operation support can be achieved. As a result, operability can be improved and safety dan be enhanced. Also, since the subordinate operation shaft is releasably engageable with the primary operation shaft of the external unit, which is movably linked with the operation of the operation switch, by engaging the subordinate operation shaft with the primary operation shaft of the external unit, the operation support of the operation switch of the external unit can be achieved.

An operation support system according to the present invention comprises the operation switch unit with the operation support function mentioned above and a remote operation part for performing a remote operation of the operation switch.

According to the present invention, when the operation switch is remotely operated by the remote operation part, the detection part detects the remote operation by the remote operation part. Then, the actuating part actuates the operation switch on the basis of the remote operation detected by the detection part to switch the state of the contact. Thereby, the operation switch can be operated from a distance, so that operation support of the operation switch can be achieved. As a result, operability can be improved and safety dan be enhanced.

Effects of the Invention

As above-mentioned, according to the present invention, the operation switch can be operated from a distance to achieve the operation support of the operation switch, thus improving operability and safety. Also, according to the present invention, since the contact is disposed on the opposite side of the operation switch with the actuating part being disposed therebetween, the structure can be simplified, and reliability can be improved.

BEST MODE FOR CARRYING OUT THE INVENTION

Figure 1:
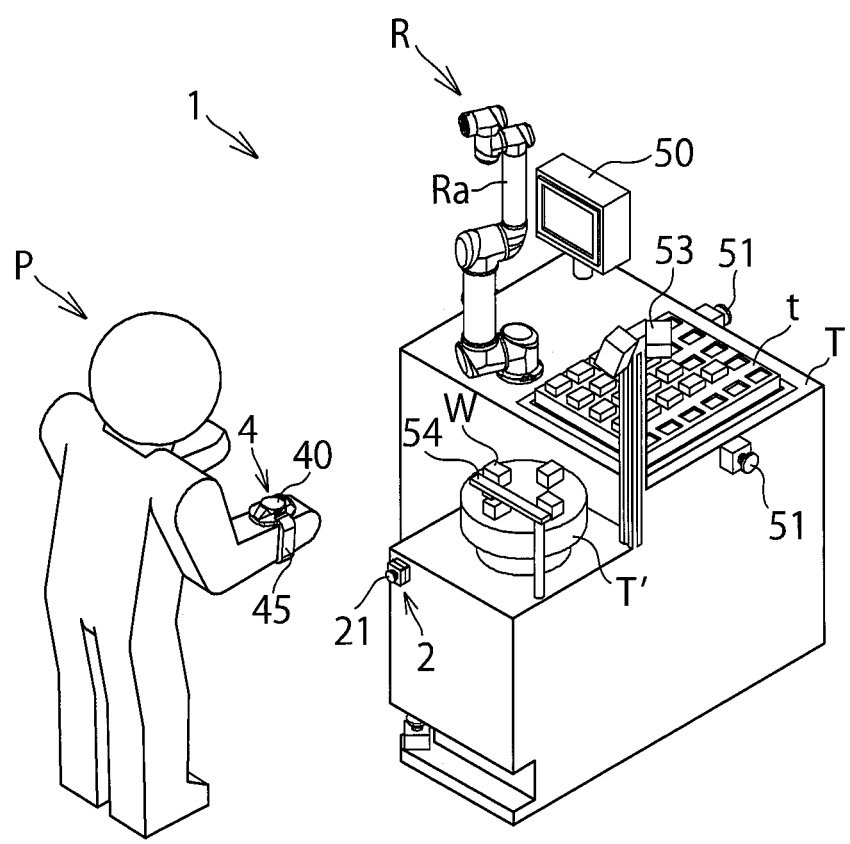
FIG. 1 is a general perspective view of an example of the operation support system incorporating the emergency stop switch as an operation switch unit with an operation support function according to an embodiment of the present invention.
Figure 2:
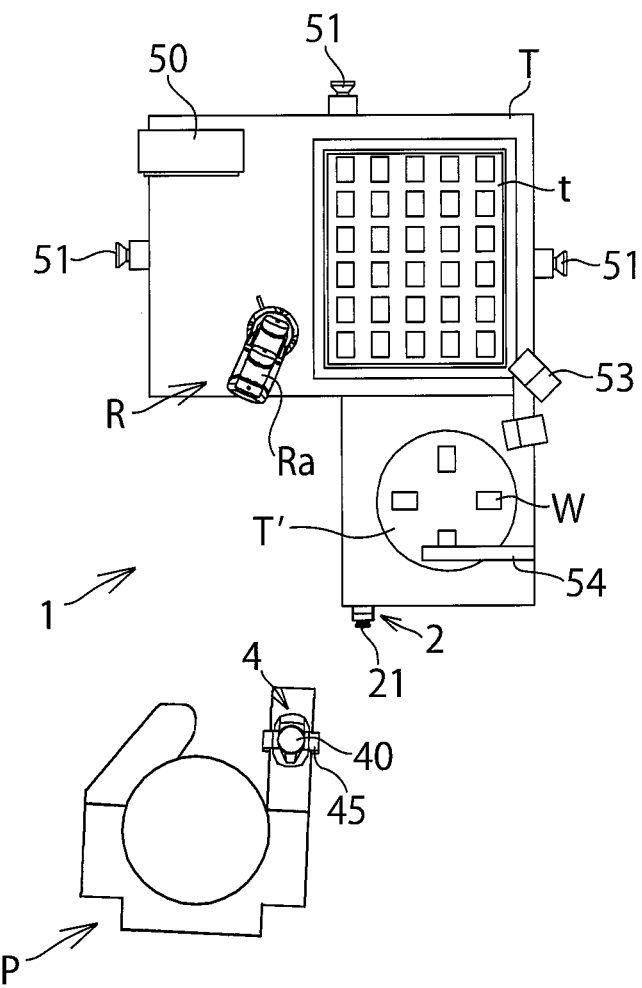
FIG. 2 is a top plan view of the operation support system of FIG. 1.
Figure 3:
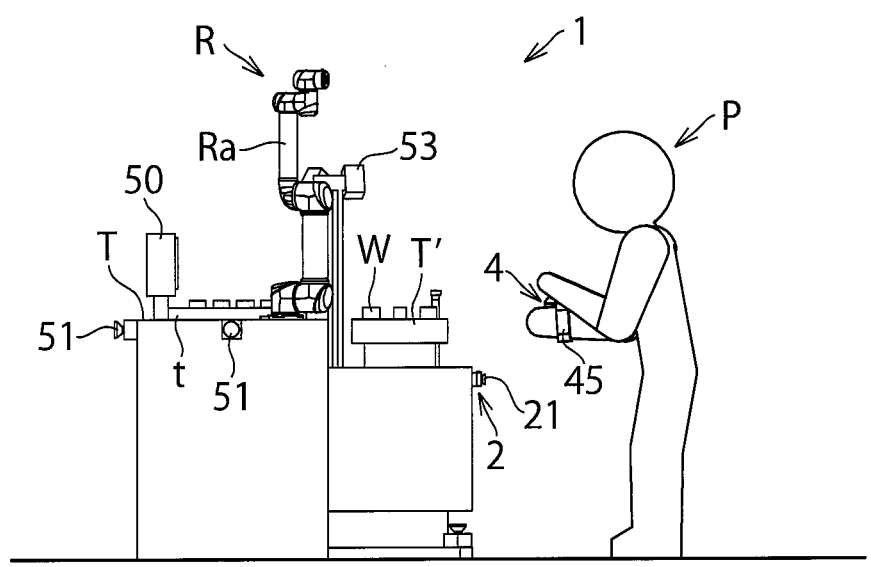
FIG. 3 is a side view of the operation support system of FIG. 1.
Figure 4:
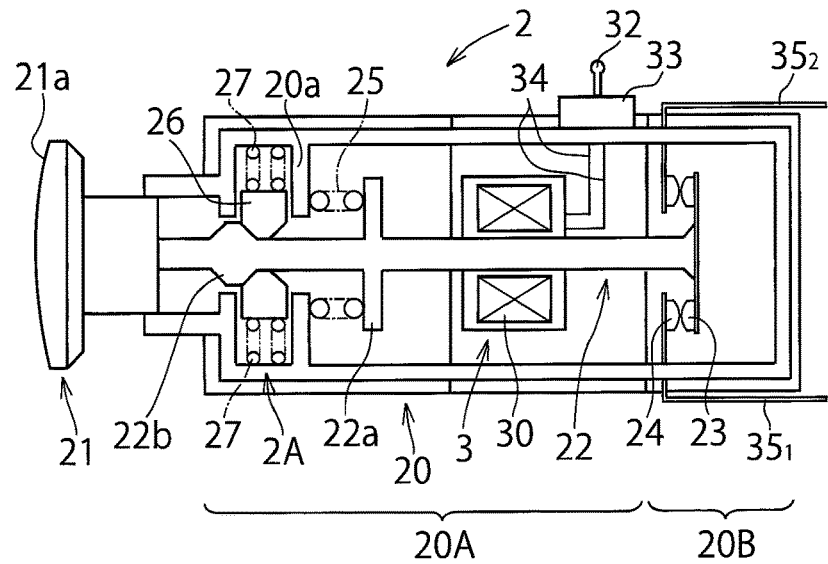
FIG. 4 is a longitudinal sectional schematic view of the emergency stop switch of FIG. 1 illustrating the state of non-operation of the emergency stop switch.
Figure 5:
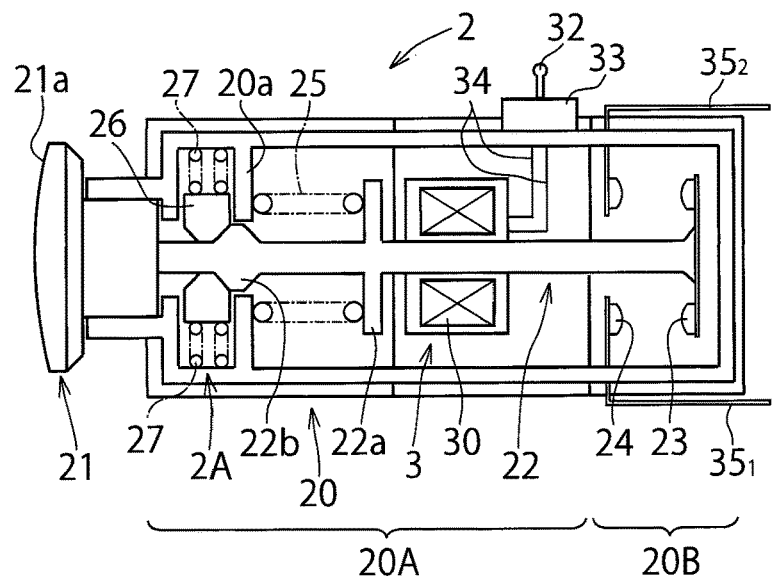
FIG. 5 is a longitudinal sectional schematic view of the emergency stop switch of FIG. 1 illustrating the state of operation (or manual operation/remote operation) of the emergency stop switch.
Figure 6:
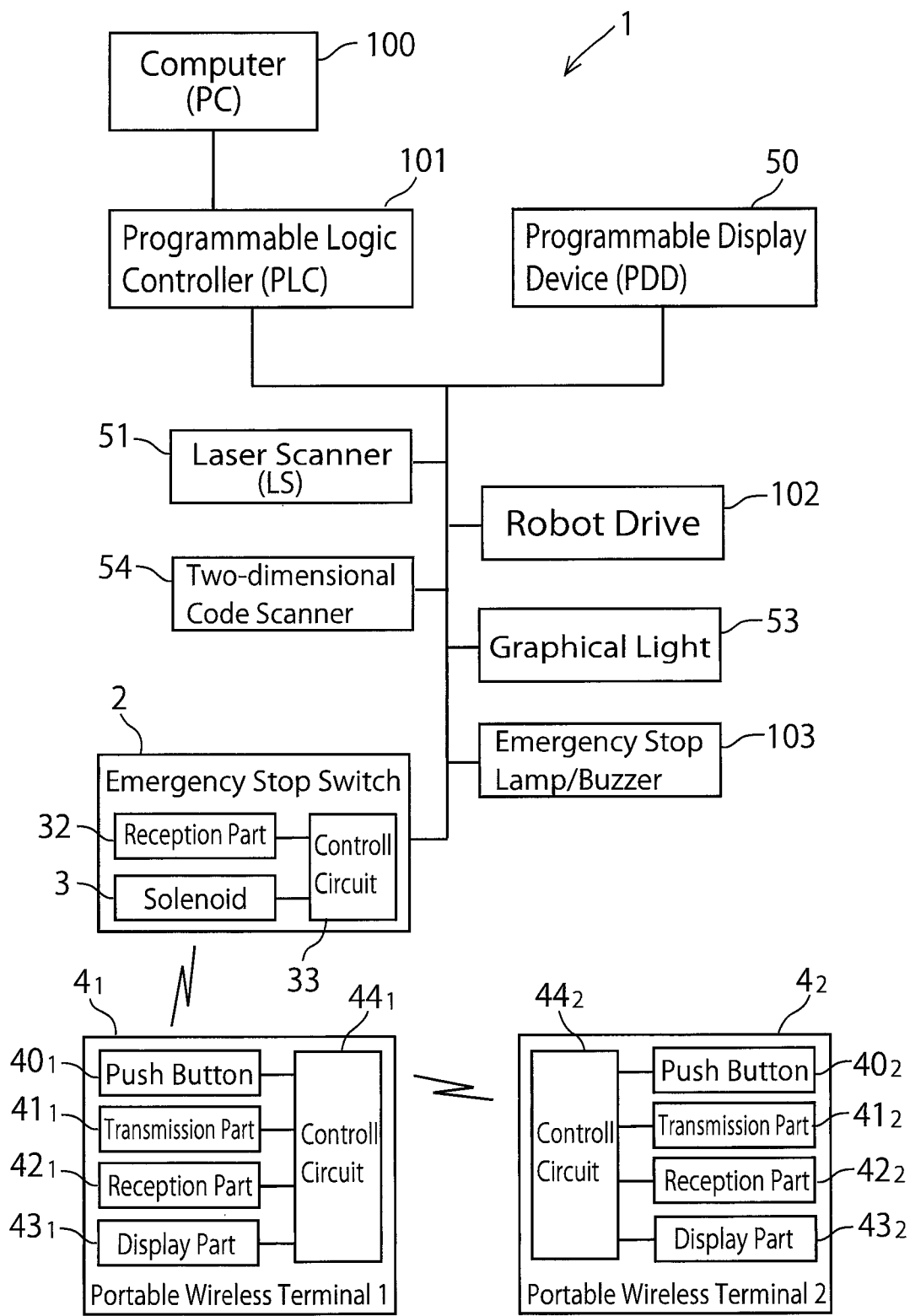
FIG. 6 is a schematic block diagram of the operation support system of FIG. 1.

The present invention will now be described in detail with reference to embodiments thereof as illustrated in the accompanying drawings. Referring to the drawings, FIGS. 1 to 6 show an emergency stop switch (or operation switch unit) with an operation support function and an operation support system employing the emergency stop switch according to an embodiment of the present invention. In these drawings, FIGS. 1 to 3 illustrate an entire operation support system. FIGS. 4 and 5 illustrate a schematic structure of the emergency stop switch. FIG. 6 illustrates a schematic block diagram of the operation support system.

As shown in FIGS. 1 to 3, the operation support system 1 includes a robot R. A worker (or an operator) P is near the robot R. The robot R may be a collaborative (or a cooperative) robot that performs work in collaboration (or cooperation) with the worker P. During operation, the robot R may pick up a work W on a sub-table T' by a hand at a distal end of a robot arm Ra and put it sequentially at a predetermined position in a tray t disposed on a work table T. On the other hand, the worked P may put the work W sequentially at a vacant position on the sub-table T' during operation of the robot R.

A programmable display device 50 may be disposed on the work table T. The programmable display device 50 may have a display such as an LCD (Liquid Crystal Display) or an organic EL (electroluminescence) display and store a control program of the robot R. Safety laser scanners 51 may be disposed on a side surface, for example, respective opposite side surfaces, and a rear surface of the table T. Each of the laser scanners 51 detects an approach of the worker P or other persons. An emergency stop switch (or operation switch unit) 2 with an operation support function is disposed on a front surface of the table T to emergently stop the robot R. The worker P has a portable (or wearable) wireless terminal (or remote operation terminal) 4 mounted on a wrist of a hand. The wireless terminal 4 performs a remote control of the emergency stop button (or operation switch) 21 of the emergency stop switch 2 and it includes a push button 40 operable by the other hand or finger of the worker P and a belt 45 holding the push button 40 and wrapped around the wrist of the worker P. A graphical light 53 may be fitted near the table T. The graphical light 53 informs the worker P of an advance information of the robot R by irradiating a next mobile spot with a light where the robot hand at a distal end of the robot arm Ra moves to. A two-dimensional code scanner 54 may be disposed on the sub-table T' to read a two-dimensional code, or a work information assigned to the work W.

Then, the internal structure of the emergency stop switch 2 will be explained hereinafter in reference to FIGS. 4 and 5.

FIG. 4 shows the state of non-operation of the emergency stop switch and FIG. 5 shows the state of operation of the emergency stop switch. In these drawings, hatching is omitted for illustration purposes.

As shown in FIGS. 4 and 5, the emergency stop switch 2 includes the following elements: a case (or housing) 20; an emergency stop button (or operation switch) 21 that is provided at one end of the case 20, that is slidably supported in the axial direction in the case 20, and that has a pressure surface (or manual operation surface) 21a to be pushed (or manually operated) by the worker P; a shaft portion (or operation shaft) 22 that extends axially in the case 20, that is connected to a rear surface on the opposite side of the pressure surface 21a of the emergency stop button 21 and that is provided so as to move linked with the operation of the emergency stop button 21; a movable contact 23 fitted to a distal end of the shaft portion 22 and movable in a moving direction of the shaft portion 22; and a fixed contact 24 that is fixedly attached to an internal wall surface of the case 20, that is disposed opposite the movable contact 23 and that makes contact with and separates from the movable contact 23.

In this exemplification, the contact of the emergency stop switch 2 is composed of a pair of movable contacts 23 and a pair of fixed contacts 24. The emergency stop button 21 is disposed on one end side of the emergency stop switch 2 and the contact is disposed on the other end side of the emergency stop switch 2. The emergency stop button 21 is provided so as to switch the state of the contact. The respective fixed contacts 24 have respective terminal strips $35_1$, $35_2$ connected thereto.

The emergency stop switch 2 further comprises an electromagnetic solenoid (or actuating part) 3 provided inside the case 20 to actuate the emergency stop button 21; a reception part (or detection part) 32 fitted to an external wall surface of the case 20 and receiving a radio signal from the wireless terminal 4 (that is, detecting the remote operation); and a control circuit 33 that controls a drive of the solenoid 3 on the basis of the remote signal received (or detected) by the reception part 32. The solenoid 3 is disposed between the contact and the emergency stop button 21. Also, the solenoid 3 includes a solenoid body (or electromagnetic coil portion) 30. The solenoid body 30 holds the shaft portion 22 slidably in an axial direction. The solenoid body 30 acts on the shaft portion 22 to move axially. The control circuit 33 is connected to the solenoid 3 through a lead wire 34.

The shaft portion 22 has a flange part 22a protruding radially outwardly in the middle of the shaft portion 22. On the internal wall surface of the case 20, a projection part 20a projecting radially inwardly is provided. The projection part 20a is disposed opposite the flange part 22a via a predetermined axial distance from the flange part 22a. Between the flange part 22a and the projection part 20a, a coil spring (or a basing means) 25 is disposed in a compressed state. One end of the coil spring 25 is in contact and engagement with the flange part 22a to move along with the shaft portion 22. The other end of the coil spring 25 is in contact and engagement with the projecting part 20a to be connected to the case 20. The coil spring 25 imparts an elastic repulsion (or biasing force) to the projecting part 20a and the flange part 22a. Such an elastic repulsion biases the movable contact 23 away from the fixed contact 24, that is, in a contact-opening direction (or to the side from an ON state to an OFF state of the emergency stop button 21, i.e. to the right side of FIG. 4).

In this example, the axial line of the coil spring 25 coincides with the axial line of the shaft portion 22. The elastic repulsion of the coil spring 25 acts in a push direction (or operation direction) of the emergency stop button 21 and in an operative direction of the solenoid 3 relative to the shaft portion 22. Also, at the time of non-operation (or before operation) of the emergency stop switch 2 shown in FIG. 4, the coil spring 25 is in a maximum compressive state between the projecting part 20a and the flange part 22a. The elastic repulsion of the coil spring 25 is at a maximum value and the coil spring 25 holds the greatest elastic energy. To the contrary, at the time of operation of the emergency stop switch 2 shown in FIG. 5, the coil spring 25 extends axially from the state of FIG. 4. The elastic repulsion of the coil spring 25 decreases and thus the elastic energy of the coil spring 25 reduces.

The shaft portion 22 includes a protruding part 22b that protrudes radially outwardly in the vicinity of the emergency stop button 21. The protruding part 22b has a trapezoidal shape with a pair of inclined surfaces in a longitudinal section. On the other hand, there are provided a pair of engagement members 26 in the case 20. Each of the engagement members 26 has a pair of inclined surfaces that are engageable with the corresponding inclined surfaces of the protruding part 22b. Each of the engagement members 26 is biased toward the corresponding protruding part 22b by an elastic repulsion of a spring 27 disposed in the case 20. At the time of non-operation shown in FIG. 4, the left-handside inclined surface of the engagement member 26 as shown in the drawing engages with the right-hand-side inclined surface of the protruding part 22b as shown in the drawing, whereas at the time of operation shown in FIG. 5, the right-hand-side inclined surface of the engagement member 26 as shown in the drawing engages with the left-hand-side inclined surface of the protruding part 22b as shown in the drawing. In such a way, in order for the emergency stop button 21 to be pushed, the protruding part 22b of the shaft portion 22 needs to securely climb over the corresponding engagement member 26. Therefore, the protruding part 22b, the engagement member 26 and the spring 27 constitute a safety Lock® mechanism 2A of the emergency stop switch 2 in which the contact will not open unless the emergency stop button 21 is operated securely.

A part of the case 20 that accommodates the electromagnetic solenoid 3, the coil spring 25, the protruding part 22b of the shaft portion 22 and the engagement member 26 corresponds to an operation part 20A. The other part of the case 20 that accommodates the contact composed of the movable contact 23 and the fixed contact 24 corresponds to a contact part 20B. On one end side of the operation part 20A, the emergency stop button 21 is disposed and on the other end side of the operation part 20A, the contact part 20B is disposed.

Next, FIG. 6 shows a schematic block diagram of the operation support system 1. As shown in FIG. 6, the operation support system 1 includes a computer (PC) 100 for programming, data-inputting and display-outputting, a programmable logic controller (PLC) 101 connected to PC 100, and a programmable display device (PDD) 50 connected to PLC 101. A robot control program is stored in PLC 101/PDD 50. Also, the laser scanner (LS) 51, the two-dimensional code scanner 54, the emergency stop switch 2, a robot drive 102 including an actuator and a motor, the graphical light 53, and an emergency stop lamp/buzzer 103 are connected to PLC 101/PDD 50. In addition, the constitution of the operation support system 1 according to the present invention is not limited to that of FIG. 6. Either PC 100, PLC 101 or PDD 50 may be omitted.

In this example, the portable-type wireless terminal 4 is composed of a plurality of wireless terminals $4_1$, $4_2$, . . . (In FIG. 6, only two terminals $4_1$ and $4_2$ are shown). The wireless terminal $4_1$ may have a wireless module fitted therein, which includes a push button $40_1$, a transmission part $41_1$, a reception part $42_1$, a display part $43_1$, and a control circuit $44_1$ which the above-mentioned elements are connected to. Similarly, the wireless terminal $4_2$ may have a wireless module fitted therein, which includes a push button $40_2$, a transmission part $41_2$, a reception part $42_2$, a display part $43_2$, and a control circuit $44_2$ which the above-mentioned elements are connected to. The wireless terminals $4_1$ and $4_2$ may be respectively held by workers $P_1$ and $P_2$ both of whom work near the robot R. Alternatively, the wireless terminal $4_1$ may be held by the worker P who works near the robot R and the wireless terminal $4_2$ may be held by a supervisor who supervises the worker P at a place away from the robot R.

The transmission parts $41_1$ and $41_2$ are provided for transmitting an operation (or stop) signal to operate the emergency stop switch 2 wirelessly when the pushbuttons $40_1$ and $40_2$ are pressed. The transmission parts $41_1$ and $41_2$ are transmissible wirelessly relative to the reception part 32 of the emergency stop switch 2. The reception part $42_1$ (or $42_2$) is provided for receiving a stop signal transmitted from the transmission part $41_2$ (or $41_1$) of another wireless terminal $4_2$ (or $4_1$). That is, the transmission parts $41_1$, $41_2$ and the reception parts $42_1$, $42_2$ of the wireless terminals $4_1$, $4_2$ are mutually radio-transmissible. The display parts $43_1$, $43_2$ are provided for display-illumination such as lighting when the worker presses the push buttons $40_1$, $40_2$, display-illumination such as blinking/flickering when another worker presses the push button first, indication of a radio wave intensity level, alarm-display of a dead battery and a radio communication disabled state, and the like. For example, radio communications that may be used in this embodiment of the present invention are as follows: Wi-Fi® communication, BLUETOOTH® communication, ZIG-BEE® communication, BLE (Bluetooth® Low Energy communication) communication, WiMAX® communication, infrared communication, and the like.

Next, actions and effects of the present invention will be explained hereinafter.

During operation, the robot R is operated in accordance with the robot control program stored in the PLC 101/PDD 50. The worker P does jobs such as placing the work W on the sub-table T' in accordance with the predetermined procedures. The robot R performs work in cooperation with the worker P. At this time, as shown in FIG. 4, the emergency stop switch 2 is in the state of non-operation that the emergency stop button 21 is not pressed. The movable contact 23 and the fixed contact 24 are in contact with one other and the contact is in an ON state.

When the worker P press-operates (or manually operates) the emergency stop button 21 of the emergency stop switch 2 during operation of the robot R, the shaft portion 22 is pressed inwardly along with the emergency stop button 21 (that is, in conjunction with the operation of the emergency stop button 21). Then, with the movement of the shaft portion 22, the inclined surfaces of the protruding parts 22b of the shaft portion 22 climb over the corresponding inclined surfaces of the engagement members 26 against the elastic repulsion of the spring 27, such that thereby the state shown in FIG. 4 is shifted to the state shown in FIG. 5. At this time, the other inclined surfaces of the protruding parts 22b of the shaft portion 22 come into engagement with the other inclined surfaces of the engagement members 26. Also, the movable contact 23 moves along with the shaft portion 22 and away from the fixed contact 24, such that thereby the contact shifts from the ON state to the OFF state. As a result, the operation of the robot R stops.

In this case, at the time of movement of the shaft portion 22, an electric current is not supplied to the solenoid body 30 holding the shaft portion 22. Therefore, there is no sliding resistance during movement of the shaft portion 22, thus allowing for the shaft portion 22 to move smoothly (that is, without a load). Accordingly, a press-operation of the emergency stop switch 2 by the worker P can be performed exactly in the same manner as a press-operation of a conventional emergency stop switch without an electromagnetic solenoid.

Then, when performing a resetting operation for restoring the emergency stop button 21 to the original state shown in FIG. 4 from the state shown in FIG. 5, the worker P grasps the emergency stop button 21 to pull it forward or toward the front side (that is, operate it manually). Then, due to the movement of the shaft portion 22, the other inclined surfaces of the protruding parts 22b of the shaft portion 22 climb over the corresponding other inclined surfaces of the engagement members 26 against the elastic repulsion of the spring 27, such that thereby the state shown in FIG. 5 is shifted to the state shown in FIG. 4. At this time, the inclined surfaces of the protruding parts 22b of the shaft portion 22 come into engagement with the inclined surfaces of the engagement members 26. Also, the movable contact 23 moves along with the shaft portion 22 and comes into contact with the fixed contact 24, such that thereby the contact shifts from the OFF state to the ON state. As a result, the operation of the robot R restarts.

In addition, regarding the resetting operation of the emergency stop button 21, by adopting a locking mechanism such as a push-lock and turn-reset mechanism, the locking state held by the internal locking mechanism (not shown) at the time of push-operation of the emergency stop button 21 may be unlocked by turning the emergency stop button 21.

On the other hand, during operation of the robot R, when the worker P presses the push button 40 (40$_1$ or 40$_2$) of the wireless terminal 4 (4$_1$ or 4$_2$), the transmission part 41$_1$ (41$_2$) of the wireless terminal 4 (4$_1$ or 4$_2$) transmits an operation (or stop) signal (see FIG. 6). The operation signal transmitted from the wireless terminal 4 (4$_1$ or 4$_2$) is received by the reception part 32 of the emergency stop switch 2 and inputted to the control circuit 33. Then, an electric current is supplied from the control circuit 33 to the solenoid body 30 of the solenoid 3, such that thereby the shaft portion 22 is drawn into the solenoid body 30 of the solenoid 3 to move to the right-hand side in FIG. 5. At this time, a collaborative relationship between the inclined surfaces of the protruding parts 22*b* and the corresponding inclined surfaces of the engagement member 26 is similar to that of a push-operation of the emergency stop button 21. The movable contact 23 moving along with the shaft portion 22 travels away from the fixed contact 24, such that thereby the contact is shifted from the ON state to the OFF state. As a result, the operation of the robot R stops.

At this juncture, the emergency stop button 21 is in a pushed-in state by moving along with the shaft portion 22. Such a state is exactly the same as a state in which the worker P manually press-operates the emergency stop button 21. When performing a resetting operation for restoring the emergency stop button 21 to the original state shown in FIG. 4 from the state shown in FIG. 5, after the electric current supply to the solenoid 3 has been stopped, the worker P grasps the emergency stop button 21 to pull it forward or toward the front side (that is, operate it manually) as with the push-operation of the emergency stop button 21. Alternatively, as mentioned above, by employing the locking mechanism such as the push-lock and turn-reset mechanism, the locking state held by the internal locking mechanism at the time of push-operation of the emergency stop button 21 may be unlocked by turning the emergency stop button 21.

According to the present embodiment, the remote operation of the emergency stop switch 2 by the wireless terminal 4 is detected by the reception part 32 of the emergency stop switch 2 and the emergency stop switch 2 is actuated based on the remote operation to open the movable contact 23 and the fixed contact 24 that are in contact with one another. Thereby, the emergency stop switch 2 can be operated even at a place away from the emergency stop switch 2. Accordingly, even in the situation that the worker P cannot push the emergency stop button 21 directly, an operation support of the emergency stop switch 2 can be performed thus improving an operability and safety.

Also, according to the present embodiment, the electromagnetic solenoid 3 is disposed between the contact and the emergency stop button 21, that is, the contact is disposed on the opposite side of the emergency stop button 21 with the solenoid interposed therebetween. The contact can thus be disposed on the end side of the case 20 of the emergency stop switch 2. Thereby, a connection with the contact can be made using short terminal strips 35$_1$, 35$_2$, thus simplifying the structure to reduce a cost and improving reliability. To the contrary, in the case that the contact is disposed at a position away from the end of the case 20 of the emergency stop switch 2, when connecting the contact with a terminal strip on the end side of the case 20, an internal wiring is needed thus making the structure complicated to increase a cost, such that thereby reliability may be decreased.

Moreover, according to the present embodiment, the coil spring 25 biases the movable contact 23 to the opening side relative to the fixed contact 24 at all times (that is, before and after operations of the emergency stop switch 2). Accordingly, especially after operation of the emergency stop switch 2, when a malfunction of the emergency stop switch 2 occurs such that the movable contact 23 returns to the state in contact with the fixed contact 24, both of the contacts 23, 24 are biased to open by the action of an elastic repulsion of the coil spring 25 and the contacts 23, 24 can be maintained in an open state. Therefore, the movable contact 23 and the fixed contact 24 are not made contacted to one other thus securing safety.

Furthermore, according to the present embodiment, since the elastic repulsion of the coil spring 25 is imparted in a push direction of the emergency stop button 21, when the movable contact 23 is caused to forcibly open relative to the fixed contact 24 by a push operation of the emergency stop button 21, the elastic repulsion of the coil spring 25 acts in the same direction as the push direction of the emergency stop button 21. As a result, the movable contact 23 can be caused to open relative to the fixed contact 24 more securely. Also, since the elastic repulsion of the coil spring 25 acts in an actuating direction of the solenoid 3 relative to the shaft portion 22, a load can be relieved at the time of operating the emergency stop button 21 by the solenoid 3, thereby decreasing an output of the solenoid 3 and reducing a cost.

According to the present embodiment, the elastic repulsion of the coil spring 25 after operation of the emergency stop switch 2 is decreased relative to the elastic repulsion of the coil spring 25 before operation of the emergency stop switch 2. Therefore, after operation of the emergency stop switch 2, an elastic energy held by the coil spring 25 is decreased and thus the elastic energy of the coil spring 25 after opening of the contact is lower than the elastic energy of the coil spring 25 before opening of the contact. As a result, even in the case that the emergency stop switch 2 has malfunctioned after operation of the emergency stop switch 2, the movable contact 23 and the fixed contact 24 will not return to the state in contact with one other thus further enhancing safety.

In the present embodiment, as a most preferred embodiment, an example was shown in which an action direction of the elastic repulsion of the coil spring 25 coincides with an action direction of the solenoid 3, but both action directions do not entirely coincide with one other. For example, the elastic repulsion of the coil spring 25 may act at an angle to the action direction of the solenoid 3. Even in such a case, an axial component of the elastic repulsion coincides with the action direction of the solenoid 3, which can be expected a certain degree of effect. Similarly, in the present embodiment, as a most preferred embodiment, an example was shown in which the action direction of the elastic repulsion of the coil spring 25 coincides with a push direction of the emergency stop button 21, but both action directions do not entirely coincide with one other. For example, the elastic repulsion of the coil spring 25 may act at an angle to the axial direction of the shaft portion 22. Even in such a case, the axial component of the elastic repulsion coincides with the push direction of the emergency stop button 21, which can be expected a certain degree of effect.

In the present embodiment, in preparation for the case that the solenoid body 30 cannot draw the shaft portion 22 inwardly due to a contact welding or the like of the movable contact 23 and the fixed contact 24, a buzzer, a speaker or an indicating lamp may be installed in order to give notice to surrounding workers by means of voice or light.

First Alternative Embodiment

Figure 7:
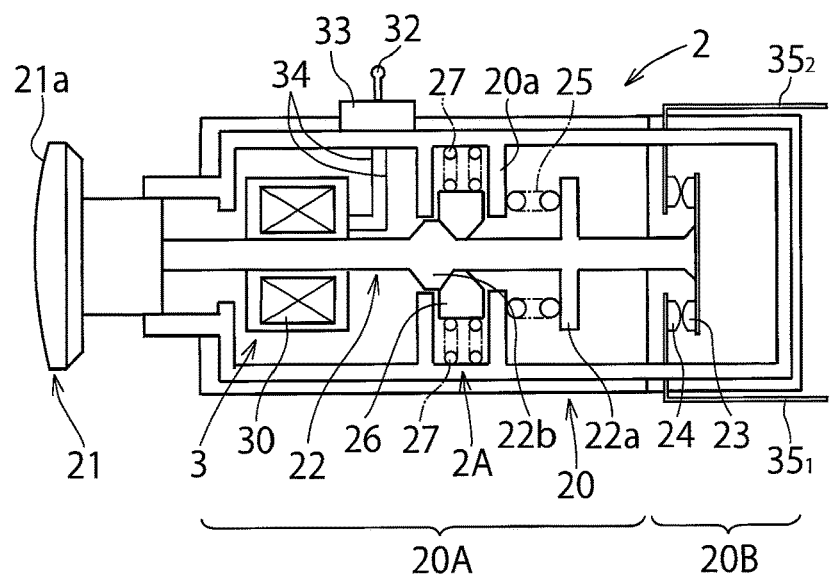
FIG. 7 illustrates a first alternative embodiment of the emergency stop switch of FIG. 4 showing the state of non-operation of the emergency stop switch.
Figure 8:
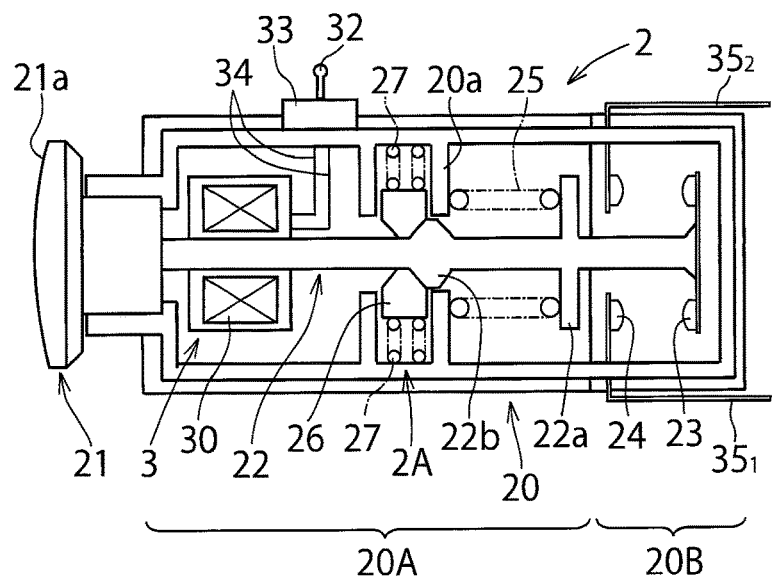
FIG. 8 illustrates the first alternative embodiment of the emergency stop switch of FIG. 5 showing the state of operation (or manual operation/remote operation) of the emergency stop switch.

In the above-mentioned first embodiment, an example was shown in which the electromagnetic solenoid 3 is disposed between the coil spring 25 (and the safety Lock® mechanism 2A) and the contact, but the application of the present invention is not restricted to such an example. FIGS. 7 and 8 show an emergency stop switch (i.e. operation switch unit) according to a first alternative embodiment of the present invention. FIG. 7 illustrates the state of non-operation of the emergency stop switch, which corresponds to FIG. 4 of the above-mentioned first embodiment, and FIG. 8 illustrates the state of operation (or manual/remote operation) of the emergency stop switch, which corresponds to FIG. 5 of the above-mentioned first embodiment. In FIGS. and 8, like reference numbers indicate identical or functionally similar elements to those in the above-mentioned first embodiment.

As shown in FIGS. 7 and 8, the electromagnetic solenoid 3 is disposed between the emergency stop button 21 and the coil spring 25 (and the safety Lock® mechanism 2A), which is in common with the above-mentioned first embodiment in that the contact is disposed on the opposite side of the emergency stop button 21 with the solenoid 3 interposed therebetween. Therefore, the effect of the first alternative embodiment is similar to that of the above-mentioned first embodiment and thus the detailed explanation is omitted here. However, regarding the position of the solenoid 3, the first alternative embodiment differs from the above-mentioned first embodiment in that the solenoid 3 is located on the front side (or to the left side of the drawing) of the safety Lock® mechanism 2A in FIG. 7 whereas the solenoid 3 is located on the back side (or to the right side of the drawing) of the safety Lock® mechanism 2A in FIG. 4. In the above-mentioned first embodiment, the solenoid 3 acts on the protruding parts 22b of the shaft portion 22 so as to be drawn relative to the engagement members 26, whereas in the first alternative embodiment the solenoid 3 acts on the protruding parts 22b of the shaft portion 22 so as to be pushed relative to the engagement members 26.

Second Alternative Embodiment

In the above-mentioned first embodiment and the first alternative embodiment, an example was shown in which the safety Lock® mechanism 2A is disposed immediately adjacent (that is, abutting on) the coil spring 25, but the application of the present invention is not limited to such an embodiment. The safety Lock® mechanism 2A may be disposed at a distance from the coil spring 25. In that case, the solenoid 3 may be disposed between the safety Lock® mechanism 2A and the coil spring 25.

Third Alternative Embodiment

Figure 9:
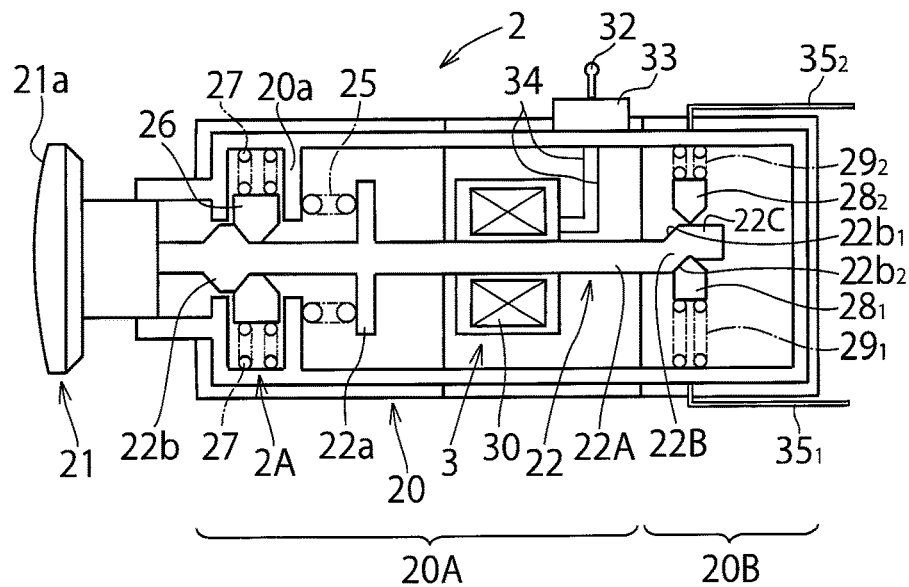
FIG. 9 illustrates a third alternative embodiment of the emergency stop switch of FIG. 4 showing the state of non-operation of the emergency stop switch.
Figure 10:
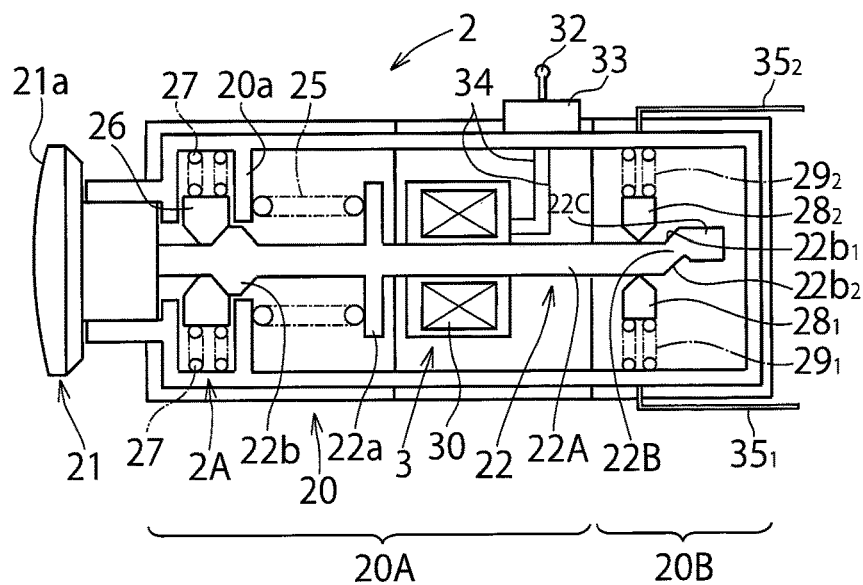
FIG. 10 illustrates the third alternative embodiment of the emergency stop switch of FIG. 5 showing the state of operation (or manual operation/remote operation) of the emergency stop switch.

In the above-mentioned first embodiment and the first and second alternative embodiments, an example was shown in which the movable contact 23 is so structured as to move along the moving direction of the shaft portion 22, but the application of the present invention is not restricted to such an example. FIGS. 9 and 10 show an emergency stop switch (or an operation switch unit) according to a third embodiment of the present invention. FIG. 9 illustrates the state of non-operation of the emergency stop switch, which corresponds to FIG. 4 of the above-mentioned first embodiment, and FIG. 10 illustrates the state of operation (or manual/remote operation) of the emergency stop switch, which corresponds to FIG. 5 of the above-mentioned first embodiment. In FIGS. 9 and 10, like reference numbers indicate identical or functionally similar elements to those in the above-mentioned first embodiment.

In the third alternative embodiment, as shown in FIGS. 9 and 10, the distal end part of the shaft portion 22 is not straight but crank-shaped. That is, the distal end part of the shaft portion 22 is composed of a first shaft portion 22A extending linearly in the axial direction, a second shaft portion 22B extending from the distal end of the first shaft portion 22A at an angle to the axial direction of the first shaft portion 22A, and a third shaft portion 22C extending from the distal end of the second shaft portion 22B parallel to the axial direction of the first shaft portion 22A. These first to third shaft portions 22A to 22C are integrated with one another. By such a structure, between the first shaft portion 22A and the second shaft portion 22B, a stepped portion (or inclined portion/engagement recess) $22b_1$ is formed. Between the second shaft portion 22B and the third shaft portion 22C, a stepped portion (or inclined portion/engagement recess) $22b_2$ is formed. In this exemplification, the stepped portion $22b_1$ is formed of a single inclined surface and the stepped portion $22b_2$ is formed of two inclined surfaces that intersect.

On the other hand, a first contact $28_1$ and a second contact $28_2$ are disposed opposite one another with the distal end part of the shaft portion 22 interposed therebetween. The first and second contacts $28_1$ and $28_2$ are shiftable in the direction intersecting (in this example, perpendicular to) the axial direction of the first shaft portion 22A and the third shaft portion 22C, that is, in the direction intersecting (in this example, perpendicular to) the moving direction of the shaft portion 22. By such a motion, the contact is so structured as to be switched. The first and second contacts $28_1$, $28_2$ are connected to the terminal strips $35_1$, $35_2$, respectively. The first contact $28_1$ has a projecting part (i.e. inclined part/engagement projection) formed of for example, inclined surfaces, which is provided to come into contact and engagement with the stepped portion $22b_2$ of the shaft portion 22. Likewise, the second contact $28_2$ has a projecting part (i.e. inclined part/engagement projection) formed of inclined surfaces, which is provided to come into contact and engagement with the stepped portion $22b_1$ of the shaft portion 22. The first contact $28_1$ is biased toward the shaft portion 22 through the elastic repulsion of the spring $29_1$. Similarly, the second contact $28_2$ is biased toward the shaft portion 22 through the elastic repulsion of the spring $29_2$. A part of the case 20 that accommodates the first and second contacts $28_1$ and $28_2$ corresponds to the contact part 20B.

As shown in FIG. 9, in the state of non-operation of the emergency stop switch 2, the first contact $28_1$ extends toward the shaft portion 22 by the elastic repulsion of the spring $29_1$ and the projecting part contacts and engages with the stepped portion $22b_2$, such that thereby the first contact $28_1$ is in an ON state. To the contrary, the second contact $28_2$ is retracted on the side of the case 20 against the elastic repulsion of the spring $29_2$ and the projecting part contacts the outer peripheral surface of the third shaft portion 22C, such that thereby the second contact $28_s$ is in an OFF state. In such a way, when the first contact $28_1$ is in the ON state and the second contact $28_2$ is in the OFF state, the contact of the emergency stop switch 2 is in the ON state.

As shown in FIG. 10, in the state of operation (i.e. manual operation/remote operation) of the emergency stop switch 2, the first contact $28_1$ is retracted on the side of the case 20 against the elastic repulsion of the spring $29_1$ and the projecting part contacts the outer peripheral surface of the first shaft portion 22A, such that thereby the first contact $28_1$ is in an OFF state. To the contrary, the second contact $28_2$ extends toward the shaft portion 22 by the elastic repulsion of the spring $29_2$ and the projecting part contacts the outer peripheral surface of the first shaft portion 22A, such that thereby the second contact $28_2$ is in an ON state. In such a way, when the first contact $28_1$ is in the OFF state and the second contact $28_2$ is in the ON state, the contact of the emergency stop switch 2 is in the OFF state.

At the time of manual operation or remote operation of the emergency stop switch 2, the emergency stop switch 2 moves onto the state of operation shown in FIG. 10 from the state of non-operation shown in FIG. 9. At this time, the first contact $28_1$ climbs over the stepped portion $22b_2$ to contact the outer peripheral surface of the first shaft portion 22A, and the second contact $28_2$ travels over the stepped portion $22b_1$ to contact the outer peripheral surface of the first shaft portion 22A. Also, at the time of resetting of the emergency stop switch 2, the emergency stop switch 2 moves onto the state of non-operation shown in FIG. 9 from the state of operation shown in FIG. 10. At this time, the second contact $28_2$ climbs over the stepped portion $22b_1$ to contact the outer peripheral surface of the third shaft portion 22C, and the first contact $28_1$ contacts and engages with the stepped portion $22b_2$.

According to the third alternative embodiment, the remote operation of the emergency stop switch 2 is detected by the reception part 32 of the emergency stop switch 2 and the emergency stop switch 2 is actuated based on the remote operation to move the shaft portion 22, such that thereby the ON/OFF states of the first and second contacts $28_1$, $28_2$ are changed to switch the contact of the emergency stop switch 2 into the OFF state. Thereby, the emergency stop switch 2 can be operated even at a place away from the emergency stop switch 2. Accordingly, even in the situation that the worker P cannot push the emergency stop button 21 directly, an operation support of the emergency stop switch 2 can be performed, thus improving an operability and safety.

Also, according to this alternative embodiment, as with the above-mentioned first embodiment, the electromagnetic solenoid 3 is disposed between the contact and the emergency stop button 21, that is, the contact is disposed on the opposite side of the emergency stop button 21 with the solenoid interposed therebetween. The contact can thus be disposed on the end side of the case 20 of the emergency stop switch 2. Thereby, a connection with the contact can be made using short terminal strips $35_1$, $35_2$, thus simplifying the structure to reduce a cost and improving reliability. To the contrary, in the case that the contact is disposed at a position away from the end of the case 20 of the emergency stop switch 2, when connecting the contact with a terminal strip on the end side of the case 20, an internal wiring is needed thus making the structure complicated to increase a cost, such that thereby reliability may be decreased.

Moreover, according to this alternative embodiment, the coil spring 25 biases the contact of the emergency stop switch 2 to the OFF state from the ON state at all times (that is, before and after operations of the emergency stop switch 2). Accordingly, especially after operation of the emergency stop switch 2, even when a malfunction of the emergency stop switch 2 occurs such that the contact returns to the ON state, the contact is biased to the OFF state by the action of an elastic repulsion of the coil spring 25 to maintain the contact in the OFF state. Thereby, the contact will not turn on thus improving safety.

Furthermore, according to this alternative embodiment, since the elastic repulsion of the coil spring 25 is imparted in a push direction of the emergency stop button 21, when the contact is made forcibly in the OFF state by a push operation of the emergency stop button 21, the elastic repulsion of the coil spring 25 acts in the same direction as the push direction of the emergency stop button 21. As a result, the contact can be made in the OFF state more securely. Also, since the elastic repulsion of the coil spring 25 acts in an actuating direction of the solenoid 3 relative to the shaft portion 22, a load can be relieved at the time of operating the emergency stop button 21 by the solenoid 3, thereby decreasing an output of the solenoid 3 and reducing a cost.

According to this alternative embodiment, the elastic repulsion of the coil spring 25 after operation of the emergency stop switch 2 is decreased relative to the elastic repulsion of the coil spring 25 before operation of the emergency stop switch 2. Therefore, after operation of the emergency stop switch 2, an elastic energy held by the coil spring 25 is decreased and thus the elastic energy of the coil spring 25 after turning-off of the contact is lower than the elastic energy of the coil spring 25 before turning-off of the contact. As a result, even in the case that the emergency stop switch 2 has malfunctioned after operation of the emergency stop switch 2, the contact will not return to the ON state again thus enhancing safety.

Fourth Alternative Embodiment

Figure 11:
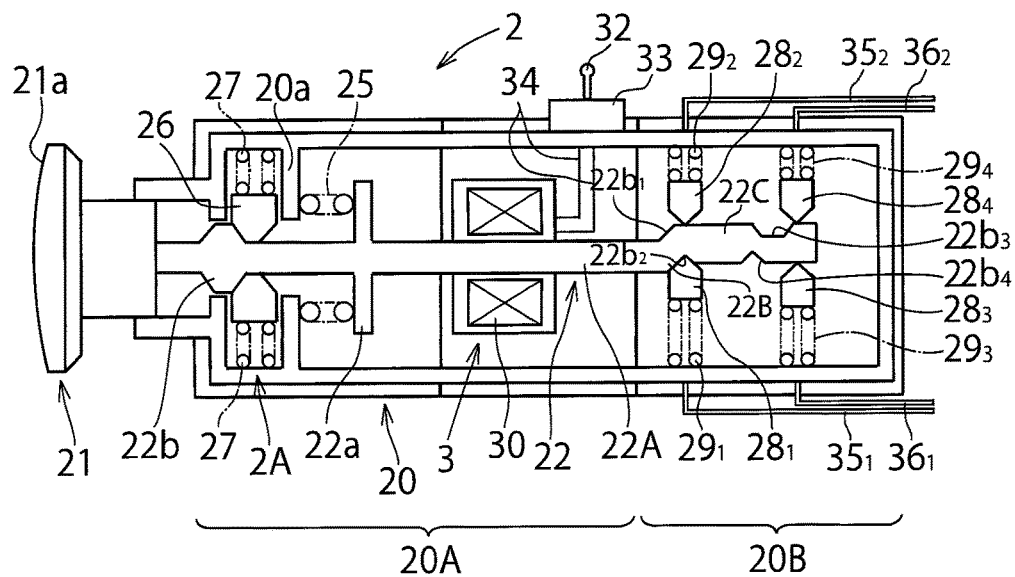
FIG. 11 illustrates a fourth alternative embodiment of the emergency stop switch of FIG. 4 showing the state of non-operation of the emergency stop switch.
Figure 12:
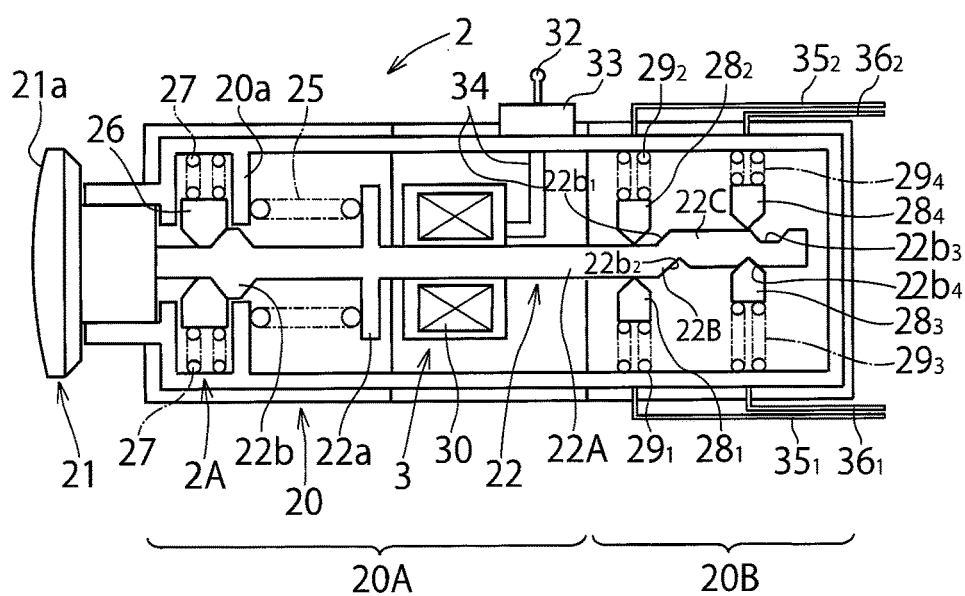
FIG. 12 illustrates the fourth alternative embodiment of the emergency stop switch of FIG. 5 showing the state of operation (or manual operation/remote operation) of the emergency stop switch.
Figure 13:
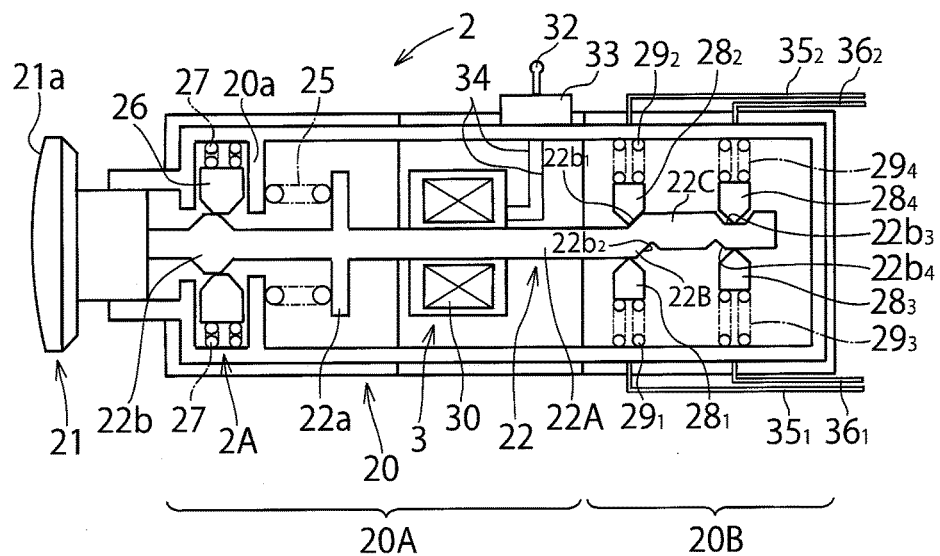
FIG. 13 illustrates the fourth alternative embodiment of the emergency stop switch of FIG. 4 showing an intermediate state of the emergency stop switch between the non-operation and the operation thereof.

FIGS. 11 to 13 show an emergency stop switch (or operation switch unit) according to a fourth alternative embodiment of the present invention. FIG. 11 illustrates the state of non-operation of the emergency stop switch, which corresponds to FIG. 9 of the third alternative embodiment, FIG. 12 illustrates the state of operation (or manual/remote operation) of the emergency stop switch, which corresponds to FIG. 10 of the third alternative embodiment, and FIG. 13 illustrates an intermediate state between the non-operational state and the operational state of the emergency stop switch. In FIGS. 11 to 13, like reference numbers indicate identical or functionally similar elements to those in the third alternative embodiment.

As shown in FIGS. 11 to 13, in this fourth alternative embodiment, the distal end part of the shaft portion 22 is crank-shaped as with the third alternative embodiment, but the distal end part is further lengthened than that of the third alternative embodiment. That is, similar to the third alternative embodiment, the distal end part of the shaft portion 22 includes a first shaft portion 22A extending linearly in the axial direction, a second shaft portion 22B extending from the distal end of the first shaft portion 22A at an angle to the axial direction of the first shaft portion 22A, and a third shaft portion 22C extending from the distal end of the second shaft portion 22B parallel to the axial direction of the first shaft portion 22A. These first to third shaft portions 22A to 22C are integrated with one another. Between the first shaft portion 22A and the second shaft portion 22B, a stepped portion (or inclined portion/engagement recess) $22b_1$ is formed. Between the second shaft portion 22B and the third shaft portion 22C, a stepped portion (or inclined portion/ engagement recess) $22b_2$ is formed. However, the third shaft portion 22C is further lengthened than that of the third alternative embodiment. At a lengthened part of the third shaft portion 22C, engagement recesses (or stepped portions/inclined portions) $22b_3$, $22b_4$ are formed. The engagement recesses $22b_3$, $22b_4$ are disposed on the opposite side of the outer peripheral surface of the third shaft portion 22C. In this exemplification, the engagement recess $22b_3$ may have a trapezoidal-shape in a longitudinal section and the engagement recess $22b_4$ may have a triangular-shape formed of two inclined surfaces intersecting one another in a longitudinal section. The central position of the engagement recess $22b_4$ is located in front of (that is, in FIGS. 11 to 13, to the left side of) the central position of the engagement recess $22b_3$.

On the other hand, a third contact $28_3$ and a fourth contact $28_4$ are disposed opposite one another with the third shaft portion 22C interposed therebetween. The third and fourth contacts $28_3$, $28_4$ are shiftable in the direction intersecting (in this example, parallel to) the axial direction of the third shaft portion 22C, that is, in the direction intersecting (in this example, perpendicular to) the moving direction of the shaft portion 22. The shift of the third and fourth contacts $28_3$, $28_4$ causes the contact to be switched. The first and second contacts $28_1$, $28_2$ have respective terminal strips $35_1$, $35_2$ connected thereto and the third and fourth contacts $28_3$, $28_4$ have respective terminal strips $36_1$, $36_2$ connected thereto. The third contact $28_3$ has a projecting part (or inclined part/engagement projection) formed of for example, inclined surfaces, which is provided to contact and engage with the engagement recess $22b_4$ of the third shaft portion 22C. Likewise, the fourth contact $28_4$ has a projecting part (or inclined part/engagement projection) formed of inclined surfaces, which is provided to contact and engage with the engagement recess $22b_3$ of the third shaft portion 22C. The third contact $28_3$ is biased toward the third shaft portion 22C by an elastic repulsion of a spring $29_3$. Similarly, the fourth contact $28_4$ is biased toward the third shaft portion 22C by an elastic repulsion of a spring $29_4$. A part of the case 20 that accommodates the first and second contacts $28_1$, $28_2$ and the third and fourth contacts $28_3$, $28_4$ corresponds to the contact portion 20B.

As shown in FIG. 11, in the state of non-operation of the emergency stop switch 2, the first contact $28_1$ extends toward the shaft portion 22 by the elastic repulsion of the spring $29_1$ and the projecting part contacts and engages with the stepped portion $22b_2$, such that thereby the first contact $28_1$ is in an ON state. The second contact $28_2$ is retracted on the side of the case 20 against the elastic repulsion of the spring $29_2$ and the projecting part contacts the outer peripheral surface of the third shaft portion 22C, such that thereby the second contact 28s is in an OFF state. Also, the third and fourth contacts $28_3$, $28_4$ are retracted on the side of the case 20 against the elastic repulsions of the springs $29_3$, $29_4$ and the projecting parts contact the outer peripheral surface of the third shaft portion 22C, such that thereby both contacts are in an OFF state. In such a way, when the first contact $28_1$ is in the ON state and the second contact $28_2$ is in the OFF state, and also the third contact $28_3$ is in the OFF state, the contact of the emergency stop switch 2 is in the ON state.

As shown in FIG. 12, in the state of operation (i.e. manual operation/remote operation) of the emergency stop switch 2, the first contact $28_1$ is retracted on the side of the case 20 against the elastic repulsion of the spring $29_1$ and the projecting part contacts the outer peripheral surface of the first shaft portion 22A, such that thereby the first contact $28_1$ is in an OFF state. The second contact $28_2$ extends toward the shaft portion 22 by the elastic repulsion of the spring $29_2$ and the projecting part contacts the outer peripheral surface of the first shaft portion 22A, such that thereby the second contact $28_2$ is in an ON state. Also, the third contact $28_3$ extends toward the shaft portion 22 by the elastic repulsion of the spring $29_3$ and the projecting part contacts and engages with the engagement recess $22b_4$, such that thereby the third contact $28_3$ is in an ON state. The fourth contact $28_4$ is retracted on the side of the case 20 against the elastic repulsion of the spring $29_4$ and the projecting part contacts the outer peripheral surface of the third shaft portion 22C, such that thereby the fourth contact $28_4$ is in an OFF state. In such a manner, when the first contact $28_1$ is in the OFF state and the second contact $28_2$ is in the ON state, and also the third contact $28_3$ is in the ON state, the contact of the emergency stop switch 2 is in the OFF state.

As shown in FIG. 13, at the time of operation (or manual operation/remote operation) of the emergency stop switch and in the state of the intermediate position of the emergency stop button 21, the protruding part 22b of the shaft portion 22 does not fully climb over the engagement member 26 that is engaged with the protruding part 22b. At this time, in the embodiment shown in FIG. 13, the first contact $28_1$ is retracted on the side of the case 20 against the elastic repulsion of the spring $29_1$ and the projecting part contacts the outer peripheral surface of the first shaft portion 22A, such that thereby the first contact $28_1$ is in the OFF state. The second contact $28_2$ extends toward the shaft portion 22 by the elastic repulsion of the spring $29_2$ and the projecting part contacts the stepped part $22b_1$ and the outer peripheral surface of the first shaft portion 22A, such that thereby the second contact $28_2$ is in the ON state. The third contact $28_3$ is retracted on the side of the case 20 against the elastic repulsion of the spring $29_3$ and the projecting part contacts the outer peripheral surface of the third shaft portion 22C, such that thereby the third contact $28_3$ is in the OFF state. The fourth contact $28_4$ extends toward the shaft portion 22 by the elastic repulsion of the spring $29_4$ and the projecting part contacts and engages with the engagement recess $22b_3$ of the third shaft portion 20C, such that thereby the fourth contact $28_4$ is in an ON state. In this way, when at least the fourth contact $28_4$ is in the ON state, the emergency stop switch 2 is in the state of the intermediate position. At this juncture, for example, in the case that the ON state of the fourth contact $28_4$ continues for more than a definite period of time, the system may determine the emergency stop switch 2 as an operation malfunction (i.e. error) to perform such a process as to output an error signal and to display an error indication on the display of the programmable display device 50 and the wireless terminal 4 and also an indicating lamp or an warning lamp.

In a manual operation or a remote operation of the emergency stop switch 2, the emergency stop switch 2 moves onto the state of operation shown in FIG. 12 from the state of non-operation shown in FIG. 11. At this juncture, the first contact $28_1$ climbs over the stepped part $22b_2$ to contact the outer peripheral surface of the first shaft portion 22A and the second contact $28_2$ passes through the stepped part $22b_1$ to contact the outer peripheral surface of the first shaft portion 22A. The third contact $28_3$ contacts and engages with the engagement recess $22b_4$ and the fourth contact $28_4$ passes through the engagement recess $22b_3$ to contact the outer peripheral surface of the third shaft portion 22C. Also, in a reset operation of the emergency stop switch 2, the emergency stop switch 2 moves onto the state of non-operation shown in FIG. 11 from the state of operation shown in FIG. 12. At this juncture, the first contact $28_1$ contacts and engages with the stepped part $22b_2$ and the second contact $28_2$ climbs over the stepped part $22b_1$ to contact the outer peripheral surface of the third shaft portion 22C. The third contact $28_3$ climbs over the engagement recess $22b_4$ to contact the outer peripheral surface of the third shaft portion 22C and the fourth contact $28_4$ passes through the engagement recess $22b_3$ to contact the outer peripheral surface of the third shaft portion 22C.

According to the fourth alternative embodiment, the remote operation of the emergency stop switch 2 is detected by the reception part 32 of the emergency stop switch 2 and the emergency stop switch 2 is actuated based on the remote operation to move the shaft portion 22, such that thereby the ON/OFF states of the first to fourth contacts $28_1$ to $28_4$ are changed to switch the contact of the emergency stop switch 2 into the OFF state. Thereby, the emergency stop switch 2 can be operated even at a place away from the emergency stop switch 2. Accordingly, even in the situation that the worker P cannot push the emergency stop button 21 directly, an operation support of the emergency stop switch 2 can be performed, thus improving an operability and safety.

Also, according to this alternative embodiment, as with the above-mentioned first embodiment, the electromagnetic solenoid 3 is disposed between the contact and the emergency stop button 21, that is, the contact is disposed on the opposite side of the emergency stop button 21 with the solenoid 3 interposed therebetween. The contact can thus be disposed on the end side of the case 20 of the emergency stop switch 2. Thereby, a connection with the contact can be made using short terminal strips $35_1$, $35_2$, $36_1$, $36_2$ thus simplifying the structure to reduce a cost and improving reliability.

Moreover, according to this alternative embodiment, since the contact is provided to detect the intermediate state between the ON state and the OFF state of the emergency stop switch 2, the operation malfunction, etc. of the emergency stop switch 2, for example, at the time of the remote operation can be detected, thus improving reliability as an emergency stop switch. Also, since a contact is provided aside from the main contacts $28_1$, $28_2$, various axial positions of the shaft portion 22 can be detected and thus different operation state of the emergency stop switch 2 can be detected, thus allowing for a delicate control.

Furthermore, according to this alternative embodiment, the coil spring 25 biases the contact of the emergency stop switch 2 to the OFF state from the ON state at all times (that is, before and after operations of the emergency stop switch 2). Accordingly, especially after operation of the emergency stop switch 2, even when a malfunction of the emergency stop switch 2 occurs such that the contact returns to the ON state, the contact of the emergency stop switch 2 is biased to the OFF state by the action of an elastic repulsion of the coil spring 25 to maintain the contact in the OFF state. Thereby, the contact is not made in the ON state thus improving safety.

According to this alternative embodiment, since the elastic repulsion of the coil spring 25 is imparted in a push direction of the emergency stop button 21, when the contact is made forcibly in the OFF state by a push operation of the emergency stop button 21, the elastic repulsion of the coil spring 25 acts in the same direction as the push direction of the emergency stop button 21. As a result, the contact can be made in the OFF state more securely. Also, since the elastic repulsion of the coil spring 25 acts in an actuating direction of the solenoid 3 relative to the shaft portion 22, a load can be relieved at the time of operating the emergency stop button 21 by the solenoid 3, thereby decreasing an output of the solenoid 3 and reducing a cost.

According to this alternative embodiment, the elastic repulsion of the coil spring 25 after operation of the emergency stop switch 2 is decreased relative to the elastic repulsion of the coil spring 25 before operation of the emergency stop switch 2. Therefore, after operation of the emergency stop switch 2, an elastic energy held by the coil spring 25 is decreased and thus the elastic energy of the coil spring 25 after turning-off of the contact is lower than the elastic energy of the coil spring 25 before turning-off of the contact. As a result, even in the case that the emergency stop switch 2 has malfunctioned after operation of the emergency stop switch 2, the contact will not return to the ON state again thus enhancing safety.

In addition, as the shape of the distal end part of the shaft portion 22, various shapes may be conceivable other than the shape shown in FIGS. 11 to 13. The shape is not necessarily a crank-shape. For example, on the opposite sides of the centerline of a straight shaft, trapezoidal convex parts in longitudinal section may be formed integrally with the straight shaft and the positions thereof are shifted in the axial direction. In this case, four contacts disposed on opposite sides of the straight shaft may contact the convex parts or contact the outer peripheral surface of the straight shaft, such that thereby the contact is switched. Also, in this case, by adjusting the positions and numbers of the respective convex parts, and the inclination of the inclined surface, an even more delicate control is possible. Moreover, the initial state of the respective contacts and the ON/OFF state after switching of the respective contacts may be made opposite the states of FIGS. 11 to 13.

Fifth Alternative Embodiment

Figure 14:
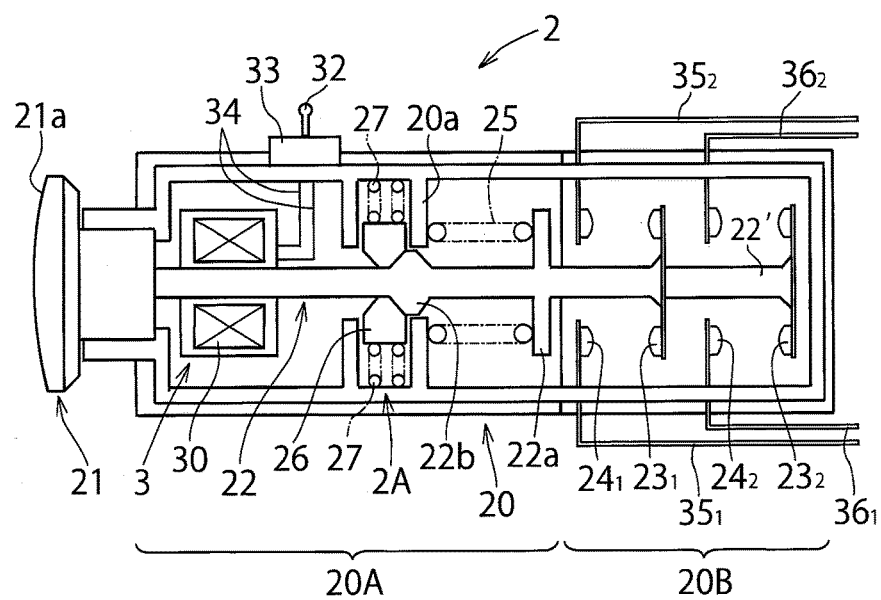
FIG. 14 illustrates a fifth alternative embodiment of the emergency stop switch of FIG. 5 showing the state of operation (or manual operation/remote operation) of the emergency stop switch.

In the above-mentioned first embodiment, an example was shown in which one contact composed of a combination of the movable contact 23 and the fixed contact 23 is provided at an end portion of the case 20 of the emergency stop switch 2, but the application of the present invention is not restricted to such an example. FIG. 14 illustrates an emergency stop switch (or operation switch unit) according to a fifth embodiment of the present invention. FIG. 14 shows the state of operation (or manual operation/remote operation) of the emergency stop switch, which corresponds to FIG. 5 of the above-mentioned first embodiment. In FIG. 14, like reference numbers indicate identical or functionally similar elements to those in the above-mentioned first embodiment.

As shown in FIG. 14, in this alternative fifth embodiment, another contact is added. That is, at an end portion of the case 20 of the emergency stop switch 2, a shaft extension part 22' is coaxially provided at the distal end of the shaft portion 22 to extend the shaft portion 22. At the distal end of the shaft extension part 22', a pair of movable contacts $23_2$ are fitted. On the other hand, at the inside wall of the case 20, a pair of fixed contacts $24_2$ are fixedly attached that are disposed opposite the respective movable contacts $23_2$ and that open and close relative to the respective movable contacts $23_2$. Terminal strips $36_1$, $36_2$ are connected to the respective fixed contacts $24_2$. A portion of the case 20 that accommodates a main contact composed of the movable contacts $23_1$ and the fixed contacts $24_1$ and an extension contact composed of the movable contacts $23_2$ and the fixed contacts $24_2$ corresponds to a contact part 20B.

In this way, since the extension contact may be provided on the end side of the case 20 of the emergency stop switch 2, adjacent to the original main contact 23, 24 (or $23_1$, $24_1$), the extension of a contact is conducted easily. In this fifth alternative embodiment, an example was shown in which one extension contact was provided, but the number of extension contacts may be two or more.

Incidentally, in the fourth alternative embodiment as well, the third and fourth contacts $28_3$, $28_4$ disposed opposite one another with the third shaft portion 22C interposed therebetween correspond to the extension contact.

Sixth Alternative Embodiment

Figure 15:
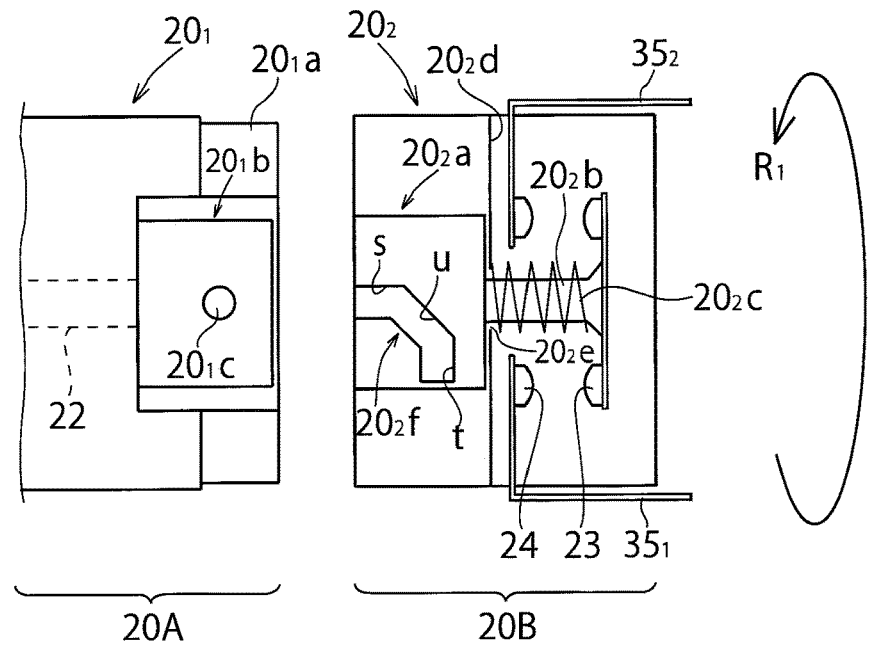
FIG. 15 illustrates a portion of a schematic longitudinal section of the emergency stop switch according to a sixth alternative embodiment of the present invention, showing the state in which the contact part detachable from the operation part is removed from the operation part.
Figure 16:
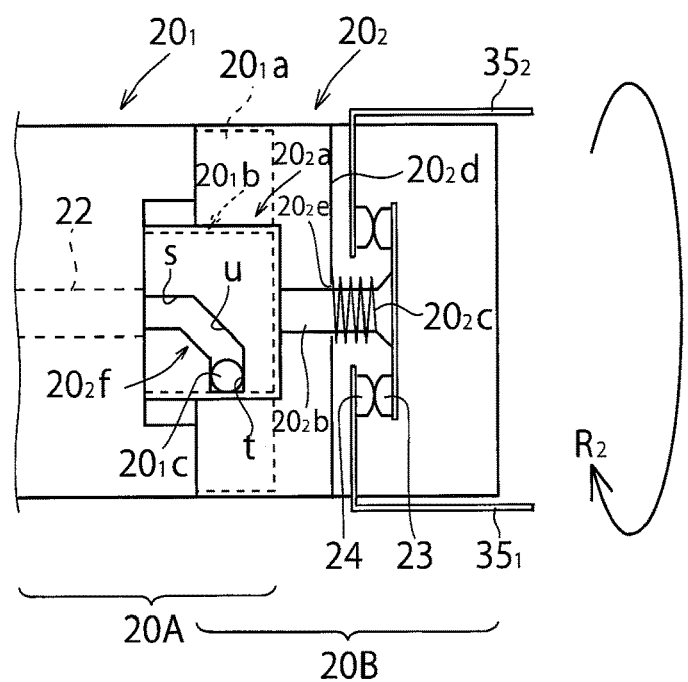
FIG. 16 illustrates the state in which the contact part is fitted to the operation part in the emergency stop switch of FIG. 15.

In the above-mentioned first embodiment and the first to fifth embodiments, an example was shown in which the emergency stop switch 2 is composed of the operation part 20A and the contact part 20B, but the contact part 20B may be detachable (or releasably attachable) relative to the operation part 20A. FIGS. 15 and 16 illustrate a schematic structure of an example of the emergency stop switch 2 in which the contact part 20B is provided detachable relative to the operation part 20A. FIG. 15 shows the state in which the contact part 20B is separated from the operation part 20A, and FIG. 16 shows the state in which the contact part 20B is fitted to the operation part 20A. Here, a detachable mechanism with a locking function is taken as an example. In FIGS. 15 and 16, like reference numbers indicate identical or functionally similar elements to those in the above-mentioned first embodiment.

As shown in FIG. 15, the operation part 20A includes a case $20_1$ and the contact part 20B includes a case $20_2$. The end portion of the case $20_1$ has a coupling part $20_1a$ that is to be coupled to the end portion of the case $20_2$. The coupling part $20_1a$ is detachably fitted to the end portion of the case $20_2$ through an engagement means such as an engagement piece (not shown) and the like. Also, the case $20_1$ has a cylindrical slider $20_1b$ fitted thereto slidably movable in the axial direction. The end of the shaft portion 22 is connected to the slider $20_1b$ and thus the slider $20_1b$ is adapted to move back and forth in the axial direction along with the shaft portion 22. On the outer peripheral surface of the slider $20_1b$, the end of a pin $20_1c$ is fixedly attached that protrudes radially outwardly.

The case $20_2$ has a cylindrical movable block $20_2a$ fitted there to slidably movable in the axial direction. The movable block $20_2a$ is connected to an end of the support shaft $20_2b$ and a pair of movable contacts 23 are fitted to the other end of the support shaft $20_2b$. Also, in the case $20_2$, a pair of fixed contacts 24 are disposed opposite the respective movable contacts 23 and have respective terminal strips $35_1$, $35_2$ connected thereto. A coil spring $20_2c$ in the compressed state is fitted around the support shaft $20_2b$. An end of the coil spring $20_2c$ presses against the side of the movable contact 23 and the other end thereof presses against a partition wall $20_2d$ provided in the case $20_2c$. The partition wall $20_2d$ has a through hole $20_2e$ formed therein that the support shaft $20_2b$ is inserted into. The support shaft $20_2b$ has for example, a square shape in cross section and the through hole $20_2e$ has a corresponding square hole. By such a structure, the support shaft $20_2b$ is axially slidable but circumferentially unrotatable. The movable block $20_2a$ has a bent groove $20_2f$ formed therein that is engageable with the pin $20_1c$. The bent groove $20_2f$ is formed of an axial groove s that opens to the end of the movable block $20_2a$, a circumferential groove t located away from the axial groove s, and a diagonal groove u that is connected to the axial groove s and the circumferential groove t. The pin $20_1c$ is adapted to travel along the bent groove $20_2d$.

When fitting the contact part 20B to the operation part 20A, from the state shown in FIG. 15, the contact part 20B is moved toward the operation part 20A, the coupling part $20_1a$ of the case $20_1$ is inserted into the end of the case $20_2$, the pin $20_1c$ of the slider $20_1b$ of the operation part 20A is inserted into the groove s of the bent groove $20_2f$ of the movable block $20_2a$ of the contact part 20B. From this state, the contact part 20B is rotated in the direction shown by an arrow mark $R_1$. Then, with the rotation of the contact part 20B, the pin $20_1c$ travels along the groove s to the groove u of the bent groove $20_2f$. At this time, with the travel of the pin $20_1c$, the slider $20_1b$ moves into the interior of the movable block $20_2a$ and along with the movement of the slider $20_1b$ the movable block $20_2a$ moves toward the case 20A. As a result of this, the shaft portion $20_2b$ and the movable contact 23 move toward the case $20_1$ against the elastic repulsion of the coil spring $20_2c$ and the movable contact 23 comes into contact with the fixed contact 24 (see FIG. 16). In such a manner, the contact part 20B is fitted to the operation part 20A. At this juncture, the elastic repulsion of the coil spring $20_2c$ is imparted to the movable block $20_2a$, such that thereby a force resulting from the elastic repulsion of the coil spring $20_2c$ acts the movable block $20_2a$ to return to the side of the case $20_2$. However, since the pin $20_1c$ is engaged with the circumferential groove t of the bent groove $20_2f$, the pin $20_1c$ will not be disengaged from the groove t and thus the contact part 20B is locked relative to the operation part 20A.

Then, to the contrary, when separating the contact part 20B from the operation part 20A, from the state shown in FIG. 16, the contact part 20B is rotated in the direction shown by an arrow mark $R_2$ opposite the rotational direction mentioned above. Then, the pin $20_1c$ travels along the groove t through the groove u to the groove s of the bent groove $20_2f$, such that thereby the contact part 20B is unlocked relative to the operation part 20A and the contact part 20B comes off from the operation part 20A (see FIG. 15).

Additionally, as shown in FIG. 16, in the state that the contact part 20B is fitted to the operation part 20A, the movable contact 23 moves back and forth through the slider $20_1b$, the movable block $20_2a$ and the support shaft $20_2b$ according to the reciprocating motion of the shaft portion 22. Thereby, the movable contact 23 is connected/separated (or closes/opens) relative to the fixed contact 24 to cause the contact of the emergency stop switch to switch.

According to this sixth alternative embodiment, the coil spring $20_2c$ biases the movable contact 23 to the opening side relative to the fixed contact 24 at all times. Accordingly, especially after operation of the emergency stop switch 2, even in the case that a mal function of the emergency stop switch 2 has occurred such that the movable contact 23 returns to the state in contact with the fixed contact 24, both of the contacts 23, 24 are biased to open by the action of the elastic repulsions of the coil spring $20_2c$ as well as the coil spring 25 (see FIGS. 4 and 5), such that thereby the contacts 23, 24 can be securely maintained in an open state. Therefore, both of the contacts 23, 24 can be further securely prevented from contacting one another thus further securing safety.

According to this alternative embodiment, since the elastic repulsion of the coil spring $20_2c$ is imparted in a push direction of the emergency stop button 21 (FIGS. 4 and 5), when the movable contact 23 is caused to forcibly open relative to the fixed contact 24 by a push operation of the emergency stop button 21, the elastic repulsion of the coil spring $20_2c$ as well as the elastic repulsion of the coil spring 25 (FIGS. 4 and 5) acts in the same direction as the push direction of the emergency stop button 21. As a result, the movable contact 23 can be made separated from the fixed contact 24 more securely. Also, since the elastic repulsion of the coil spring $20_2$c acts in the actuating direction of the electromagnetic solenoid 3 (FIGS. 4 and 5) relative to the shaft portion 22, a load can be relieved at the time of actuating the emergency stop button 21 by the solenoid 3, thereby decreasing an output of the solenoid 3 and reducing a cost.

According to this alternative embodiment, the elastic repulsion of the coil spring $20_2$c after operation of the emergency stop button 21 (FIGS. 4 and 5) is decreased relative to the elastic repulsion of the coil spring $20_2$c before operation of the emergency stop button 21. Therefore, after operation of the emergency stop button 21, an elastic energy held by the coil spring $20_2$c is decreased and thus the elastic energy of the coil spring $20_2$c after opening of the contact is lower than the elastic energy of the coil spring $20_2$c before opening of the contact. As a result, even in the case that the emergency stop switch 2 has malfunctioned after operation of the emergency stop button 21, the movable contact 23 and the fixed contact 24 will not return to the state in contact with one other thus further enhancing safety.

Seventh Alternative Embodiment

Figure 17:
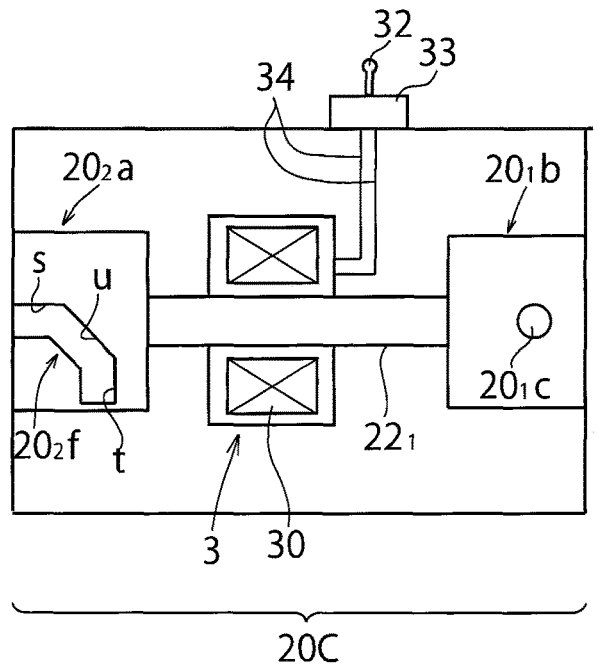
FIG. 17 is a schematic longitudinal sectional view of the operation switch with an operation support function according to a seventh alternative embodiment of the present invention.
Figure 18:
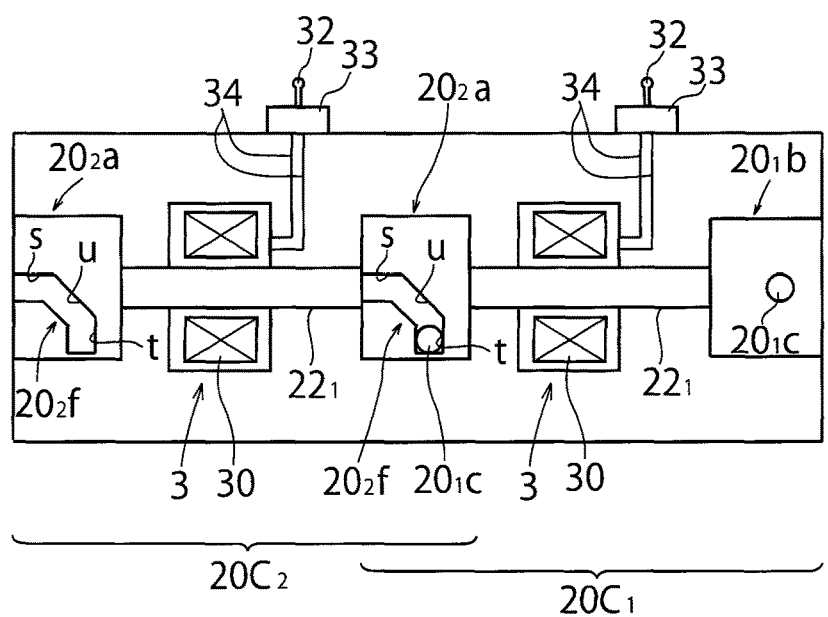
FIG. 18 is a schematic longitudinal sectional view illustrating the state in which the operation unit of FIG. 17 is interconnected to one another.

FIGS. 17 and 18 illustrate an operation unit with an operation support function according to a seventh alternative embodiment of the present invention. FIG. 17 is a longitudinal sectional view of the operation unit and FIG. 18 is a longitudinal sectional view showing the state in which the operation unit of FIG. 17 is coupled to one another. In these drawings, like reference numbers indicate identical or functionally similar elements to those in the above-mentioned first embodiment and the sixth alternative embodiments.

As shown in FIG. 17, an operation unit 20C has a shaft portion (or subordinate operation shaft) $22_1$ extending axially and an electromagnetic solenoid (or actuating part) 3 into which the shaft portion $22_1$ is inserted. A solenoid body (or electromagnetic coil portion) 30 of the electromagnetic solenoid 3 supports the shaft portion $22_1$ slidably in the axial direction. The solenoid body 30 functions to cause the shaft portion $22_1$ to move in the axial direction. On the external wall surface of the operation unit 20C, there are provided a reception part (or detection part) 32 for receiving a radio signal (that is, detecting a remote control) from the wireless terminal 4 and a control circuit 33 for controlling the drive of the electromagnetic solenoid 3 based on the remote signal received (or detected) by the reception part 32. The control circuit 33 is connected to the electromagnetic solenoid 3 through a lead wire 34.

At an end of the operation unit 20C, a slider $20_1$b is provided slidably in the axial direction. The slider $20_1$b is coupled to an end of the shaft portion $22_1$. On the outer peripheral surface of the slider $20_1$b, an end of the pin (or engagement means) $20_1$c is fixedly attached that protrudes radially outwardly. At the other end of the operation unit 20C, a movable block $20_2$a is provided slidably in the axial direction. The movable block $20_2$a is coupled to the other end of the shaft portion $22_1$. By such a structure, the slider $20_1$b and the movable block $20_2$a move back and forth in the axial direction according to the reciprocating motion of the shaft portion $22_1$. Also, the movable block $20_2$a has a bent groove (or engagement means) $20_2$f formed therein that the pin $20_1$c is engageable with. The bent groove $20_2$f is composed of an axial groove s that opens at the end of the movable block $20_2$a, a circumferential groove t disposed away from the groove s, and a diagonal groove u that communicates with the axial groove s and the circumferential groove t. The pin $20_1$c is movable along the bent groove $20_2$f.

The operation unit 20C is inserted and used, for example, between the operation part (or external unit) 20A in FIG. 15 and the contact part 20B. At this time, the pin $20_1$c of the slider $20_1$b of the operation part 20A is releasably engaged with the bent groove $20_2$f of the movable block $20_2$a of the operation unit 20C. That is, the shaft portion (or subordinate operation shaft) $22_1$ of the operation unit 20C is releasably engageable with the shaft portion (or primary operation shaft) 22 of the operation part 20A. Also, the pin $20_1$c of the slider $20_1$b of the operation unit 20C is releasably engaged with the bent groove $20_2$f of the movable block $20_2$a of the contact part 20B.

In this case, when the shaft portion 22 of the operation part 20A is manually operated, the shaft portion $22_1$ of the operation unit 20C moves in the axial direction through the slider $20_1$b of the operation unit 20A and the movable block $20_2$a of the operation unit 20C. Accordingly, through the slider $20_1$b of the operation unit 20C and the movable block $20_2$a of the contact part 20B, the support shaft $20_2$b of the contact part 20B moves to cause the contact to be switched. On the other hand, when performing a remote operation of the shaft portion $22_1$ of the operation unit 20C, an operation signal transmitted from the wireless terminal 4 is received by the reception part 32 and inputted in the control circuit 33, such that thereby an electric current is supplied to the solenoid body 30 of the electromagnetic solenoid 3 from the control circuit 33. The shaft portion $22_1$ thus moves axially in the solenoid body 30. Then, through the slider $20_1$b of the operation unit 20C and the movable block $20_2$a of the contact part 20B, the support shaft $20_2$b of the contact part 20B moves to cause the contact to be switched. At this time, the shaft portion 22 of the operation part 20A moves axially as with the manual operation.

In such a manner, the shaft portion $22_1$ of the operation unit 20C can be operated even at a place away from the operation unit 20C, thereby performing an operation support to improve operability and safety. Also, since the shaft portion (or subordinate operation shaft) $22_1$ is provided releasably engageable with the shaft portion 22 of the operation part (or external unit) 20A having the shaft portion (or primary operation shaft) 22 that moves linked with the operation of the emergency stop button (or operation switch) 21, by engaging the shaft portion $22_1$ with the shaft portion 22 of the operation part 20A, the operation support of the emergency stop button 21 of the operation part 20A can be performed.

FIG. 18 illustrates the state in which the pin $20_1$c of the slider $20_1$b of the operation support unit $20C_2$ is engaged with the bent groove $20_2$f of the movable block $20_2$a of the operation support unit $20C_1$ and two operation support units $20C_1$, $20C_2$ are coupled to one another. In this way, it is possible to couple a plurality of operation support units 20C to one another. In this case, since each of the operation support units 20C has an electromagnetic solenoid 3, a great drive force can be obtained in performing a remote operation of the respective shaft portions 22.

Figure 19:
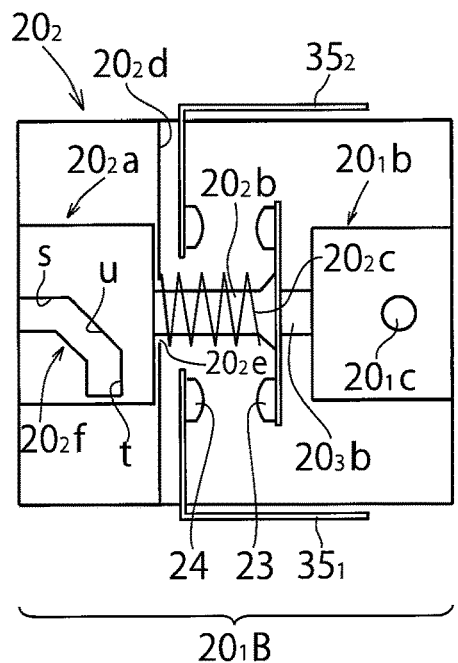
FIG. 19 is a schematic longitudinal sectional view illustrating an alternative example of the contact of the emergency stop switch of FIG. 15.

Next, FIG. 19 shows a variant of the contact part 20B. In FIG. 19, like reference numbers indicate identical or functionally similar elements to those in FIG. 15. As shown in FIG. 19, at the end portion on the contact-side of the contact part $20_1$B, the slider $20_1$b is provided movably in the axial direction. An end of a support shaft $20_3$b disposed coaxially with the support shaft $20_2$b is connected to the slider $20_1$b and the other end of the support shaft $20_3$b is connected to the back side of the movable contact 23. On the outer circumferential surface of the slider $20_1b$, the end of the pin $20_1c$ is fixedly attached that protrudes radially outwardly.

The contact part $20_1$B is inserted and used, for example, between the operation part 20A in FIG. 15 and the contact part 20B. At this juncture, the pin $20_1c$ of the slider $20_1b$ of the operation part 20A is releasably engaged with the bent groove $20_2f$ of the movable block $20_2a$ of the contact part $20_1$B, and the pin $20_1c$ of the slider $20_1b$ of the contact part $20_1$B is releasably engaged with the bent groove $20_2f$ of the movable block $20_2a$ of the contact part 20B. In this way, the contact part of the emergency stop switch 2 can be extended. In this case, the movement of the shaft portion 22 of the operation part 20A is transmitted to the respective movable contacts 23 via the support shafts $20_2b$, $20_3b$. In addition, the contact part $20_1$B can be used in lieu of the contact part 20B in FIG. 15.

Figure 20:
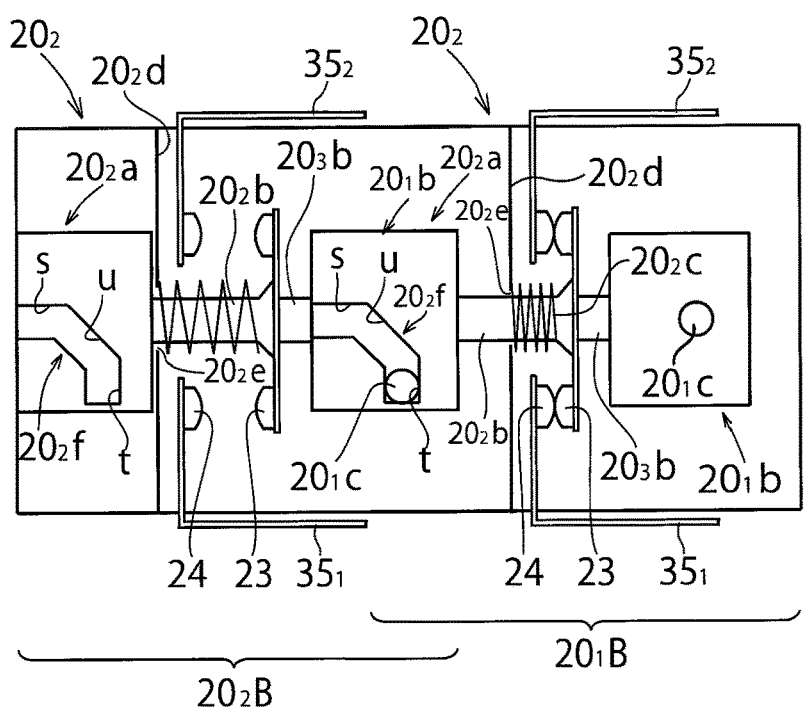
FIG. 20 is a schematic longitudinal sectional view illustrating the state in which the contact of FIG. 19 is interconnected to one another.

FIG. 20 shows the state in which two contact parts $20_1$B, $20_2$B are coupled to one another by engaging the pin $20_1c$ of the slider $20_1b$ of the contact part $20_2$B with the bent groove $20_2f$ of the movable block $20_2a$ of the contact part $20_1$B. In such a manner, a plurality of contact parts 20B can be coupled to one another thus facilitating the expansion of the contact part.

Eighth Alternative Embodiment

In the above-mentioned first embodiment, as an actuating part to actuate the emergency stop button 21, the electromagnetic solenoid 3 was taken as an example, but the application of the present invention is not restricted to such an example. As an actuating part, a mechanism other than the electromagnetic solenoid 3 (e.g. a reciprocating mechanism, etc. such as an electric cylinder or a rack-and-pinion, etc.) may be employed.

Ninth Alternative Embodiment

In the above-mentioned first embodiment, as an operation switch unit, the emergency stop switch was taken as an example, but the application of the present invention is not restricted to such an example. Other stop switch such as a temporary stop switch and the like may be used. Also, a switch that deals with discrete values such as a selector switch to speed-control by switching speed, lever switch, cam switch, foot switch and the like may be used. Therefore, the signal transmitted from the transmission part $41_1$, $41_2$ of the wireless terminal 4 ($4_1$, $4_2$) includes not only a stop signal but also other operation signals in general. Additionally, in those switches, regarding resetting as well as actuation of the operation switch, a wireless remote control may be performed using an electromagnetic solenoid, etc.

Tenth Alternative Embodiment

In the above-mentioned first embodiment, as a remote operation part and a detection part, the wireless terminal 4 and the reception part 32 were respectively taken as examples, but the application of the present invention is not restricted to such examples. The remote operation part and the detector part may include the following combinations: the combination of optical signal and a photoelectric sensor; the combination of audio signal and a microphone; the combination of video signal and a camera; the combination of an operation instrument such as a lever that operates a linear/rod-like long member such as a wire and a movable member that follows the movement of the distal end of the long member; the combination of a nozzle spouting compressed air and a receiving member that receives compressed air from the nozzle; and the combination of a gun that fires bullets such as BB bullets and a target member that is hit by the bullet fired by the gun, etc.

Other Alternative Embodiment

The above-mentioned first embodiment and the respective alternative embodiments should be considered in all respects only as illustrative and not restrictive. Those skilled in the art to which the invention pertains may make modifications and other embodiments employing the principles of this invention without departing from its spirit or essential characteristics particularly upon considering the foregoing teachings, even if there are no explicit explanations in the description.

Other Applicable Example

In the above-mentioned first embodiment and the respective alternative embodiments, a collaborative robot was taken as an example as an apparatus that the emergency stop switch of the present invention is applied to, but the present invention also has application to industrial robots other than the collaborative robot. Also, the application of the present invention is not restricted to a vertically articulated robot but is applicable to other robots such as a SCARA robot and a parallel link robot and also to an AGV (Automated Guided Vehicle). Furthermore, the application of the present invention is not limited to the field of FA (Factory Automation) (i.e. manufacturing industry) but may be the field of industrial vehicles and construction vehicles including special vehicles such as a power shovel and the like (i.e. construction/civil work industry), restaurant business, food industry, medicine and distribution industry.

INDUSTRIAL APPLICABILITY

The present invention is of use to an operation switch unit and an operation support system with an operation support function that can perform operation function of the operation switch.

DESCRIPTION OF REFERENCE NUMERALS

1: operation support system
2: emergency stop switch (operation switch unit)
21: emergency stop button (operation switch)
22: shaft portion (operation shaft)
23: movable contact
24: fixed contact
25: coil spring (biasing means)
$28_1$-$28_4$: contact
3: electromagnetic solenoid (actuating part)
32: reception part (detection part)
4: wireless terminal (remote operation part)

The invention claimed is:
1. An operation unit with an operation support function comprising:
   a subordinate operation shaft releasably engageable with and coaxially aligned with a primary operation shaft of an external unit, said primary operation shaft being movably linked with an operation of an operation switch;
   a detection part that detects a remote operation of said subordinate operation shaft; and an actuating part that actuates said subordinate operation shaft on a basis of the remote operation detected by said detection part, wherein an actuation of said actuating part causes said subordinate operation shaft to move in an axial direction, thereby causing said primary operation shaft along with said operation switch to be displaced in a same axial direction as said axial direction of said subordinate operation shaft.

2. An operation support system comprising:

said operation unit with said operation support function according to claim 1; and a remote operation part for performing a remote operation of said operation switch.

3. The operation unit according to claim 1, wherein said operation switch is an emergency stop button.

\* \* \* \* \*